(12) United States Patent  (10) Patent No.: US 9,182,903 B2
Lombardi et al.  (45) Date of Patent: Nov. 10, 2015

(54) METHOD AND APPARATUS FOR KEYWORD GRAPHIC SELECTION

(71) Applicant: Motorola Mobility LLC, Libertyville, IL (US)

(72) Inventors: Michael J. Lombardi, Lake Zurich, IL (US); Mitul R. Patel, Lake Zurich, IL (US); Amber M. Pierce, Libertyville, IL (US); Natalie J. Stevens, Spring Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 208 days.

(21) Appl. No.: 13/964,028

(22) Filed: Aug. 9, 2013

(65) Prior Publication Data

US 2015/0042570 A1    Feb. 12, 2015

(51) Int. Cl.

| | |
|---|---|
| *G10L 21/00* | (2013.01) |
| *G10L 25/00* | (2013.01) |
| *G10L 15/00* | (2013.01) |
| *G06F 3/0488* | (2013.01) |
| *G06F 1/32* | (2006.01) |
| *G06F 3/041* | (2006.01) |
| *G06F 3/16* | (2006.01) |

(52) U.S. Cl.
CPC ............. *G06F 3/0488* (2013.01); *G06F 1/32* (2013.01); *G06F 1/3206* (2013.01); *G06F 3/0412* (2013.01); *G06F 3/167* (2013.01)

(58) Field of Classification Search
CPC ....... G10L 15/22; G10L 15/265; G06F 3/167; H04M 2201/40
USPC .......................................................... 704/275
See application file for complete search history.

(56) References Cited

U.S. PATENT DOCUMENTS

| | | |
|---|---|---|
| 5,570,369 A | 10/1996 | Jokinen |
| 6,137,466 A | 10/2000 | Moughanni et al. |

(Continued)

FOREIGN PATENT DOCUMENTS

| | | |
|---|---|---|
| EP | 2189890 A2 | 5/2010 |
| EP | 2620858 A2 | 7/2013 |

(Continued)

OTHER PUBLICATIONS

Notice of Allowance from U.S. Appl. No. 13/964,032, dated Jan. 14, 2015, 10 pp.

(Continued)

*Primary Examiner* — Jesse Pullias
(74) *Attorney, Agent, or Firm* — Shumaker & Sieffert, P.A.

(57) ABSTRACT

A method on an electronic device is described. A set of graphics and a set of stored keywords are received in a higher-power mode of operation, each graphic corresponding to one or more of the stored keywords. The higher-power mode of operation is discontinued to enter a lower-power mode of operation. In the lower-power mode: audio signals are listened for; it is detected whether any keywords of the set of stored keywords are present in the audio signals; detected keywords present in the audio signals are stored; a graphic is selected from the set of graphics based on a comparison between the set of detected keywords and the set of stored keywords; a first portion of the selected graphic is displayed, in response to the at least one control signal, on a first area of a touch screen display that is within a first portion of the touch screen display.

20 Claims, 12 Drawing Sheets

(56) References Cited

U.S. PATENT DOCUMENTS

| | | | |
|---|---|---|---|
| 6,539,358 B1* | 3/2003 | Coon et al. | 704/275 |
| 7,194,248 B2 | 3/2007 | Kim | |
| 7,474,288 B2 | 1/2009 | Smith et al. | |
| 7,894,836 B1 | 2/2011 | Fuoss | |
| 7,913,182 B2 | 3/2011 | Bear et al. | |
| 7,995,050 B2 | 8/2011 | Wong et al. | |
| 8,294,659 B2 | 10/2012 | Rosenblatt | |
| 8,296,142 B2* | 10/2012 | Lloyd et al. | 704/257 |
| 8,514,757 B2 | 8/2013 | Lee et al. | |
| 8,539,382 B2 | 9/2013 | Lyon et al. | |
| 2007/0026844 A1* | 2/2007 | Watanabe | 455/412.1 |
| 2007/0192109 A1* | 8/2007 | Likens et al. | 704/275 |
| 2007/0268200 A1 | 11/2007 | Fuller et al. | |
| 2008/0158117 A1 | 7/2008 | Wong et al. | |
| 2009/0006991 A1 | 1/2009 | Lindberg et al. | |
| 2009/0100141 A1 | 4/2009 | Kirkland et al. | |
| 2010/0171753 A1 | 7/2010 | Kwon | |
| 2010/0257490 A1 | 10/2010 | Lyon et al. | |
| 2010/0269040 A1 | 10/2010 | Lee | |
| 2010/0309105 A1 | 12/2010 | Baldischweiler | |
| 2010/0328431 A1 | 12/2010 | Kim et al. | |
| 2012/0005509 A1 | 1/2012 | Araki et al. | |
| 2012/0064937 A1 | 3/2012 | Petitgrand et al. | |
| 2012/0169608 A1 | 7/2012 | Forutanpour et al. | |
| 2012/0208501 A1 | 8/2012 | Tsuda | |
| 2012/0229399 A1 | 9/2012 | Kobayashi et al. | |
| 2012/0254878 A1 | 10/2012 | Nachman et al. | |
| 2013/0080171 A1 | 3/2013 | Mozer et al. | |
| 2013/0124207 A1 | 5/2013 | Sarin et al. | |
| 2013/0191791 A1 | 7/2013 | Rydenhag et al. | |
| 2013/0215061 A1 | 8/2013 | Rydenhag et al. | |
| 2013/0222208 A1 | 8/2013 | Gorilovsky et al. | |
| 2013/0307809 A1 | 11/2013 | Sudou | |
| 2014/0063049 A1 | 3/2014 | Armstrong-muntenr | |
| 2014/0118272 A1 | 5/2014 | Gunn | |
| 2014/0120988 A1 | 5/2014 | Gunn et al. | |
| 2014/0122911 A1 | 5/2014 | Gunn et al. | |
| 2014/0335827 A1 | 11/2014 | Tsuda | |

FOREIGN PATENT DOCUMENTS

| | | | |
|---|---|---|---|
| WO | 2012044201 A2 | 4/2012 | |
| WO | 2012108213 A1 | 8/2012 | |
| WO | 2013061156 A2 | 5/2013 | |
| WO | 2013126078 A1 | 8/2013 | |

OTHER PUBLICATIONS

Notice of Allowance from U.S. Appl. No. 13/964,034, dated Jan. 30, 2015, 16 pp.
International Search Report and Written Opinion of international application PCT/US2014/050387, dated Nov. 4, 2014, 11 pgs.
International Search Report and Written Opinion of international application PCT/US2014/050385, dated Nov. 10, 2014, 9 pgs.
Diaz, "iPhones May Have Always-On Display". Retrieved from the Internet: <http:/Igizmodo.com/5094416/future-iphones-may-have-always+on-display> Nov. 20, 2008. 4 pgs.
"LG Mytouch—Do Not Get Power Button Is Faulty", T-Mobile Support. Retrieved from the Internet: <http://support.t-mobile.com/thread/37912> Jan. 11, 2013. 3 pgs.
"Sensor Platforms' FreeMotion Library Now Works With All Mobile Microprocessors", Sensor Platforms Inc. Retrieved from the Internet: <http://www.sensorplatforms.com/sensor-platforms-freemotion-library-now-works-with-all-mobile-microprocessors/> Jul. 18, 2012. 2 pgs.
"Sensing Subsystem: Sensor Hubs, Smart Sensors and Application Processors", Sensor Platforms Inc. Retrieved from the Internet: <http://www. sensorplatforms.com/sensing-subsystem/> Nov. 1, 2011. 2 pgs.
Torres, "Using sensor controllers to reduce power consumption in mobile computing", Texas Instruments. Retrieved from the Internet: <http://www.embedded.com/design/power-optimization/4396126/Using-sensor-controllers-to-reduce-power-consumption-in-mobile-computing> Sep. 12, 2012. 7 pgs.
U.S. Appl. No. 13/964,032, filed Aug. 9, 2013, Lombardi et al.
Florence Ion, An always-on Siri: MindMeld listens to you talk, finds what you need, http://arstechnica.com/gadgets/2012/10/an-always-on-siri-mindmeld-listens-to-you-talk-finds-what-you-need/, Oct. 5, 2012, all pages.
Kit Eaton, Your Smartphone Is Listening to You Sleep: The Next Terrifying, Awesome Frontier in Voice Tech, http://www.fastcompany.com/3001572/your-smartphone-listening-you-sleep-next-terrifying-awesome-frontier-voice-tech, Sep. 25, 2012, all pages.
Notice of Allowance from U.S. Appl. No. 13/964,032, mailed Feb. 17, 2015 9 pp.
Notice of Allowance from U.S. Appl. No. 13/964,034, mailed Aug. 10, 2015 15 pp.
Notice of Allowance from U.S. Appl. No. 14/699,644 mailed Aug. 10, 2015 8 pp.
Notice of Allowance from U.S. Appl. No. 13/964,034, mailed Apr. 24, 2015 16 pp.

* cited by examiner

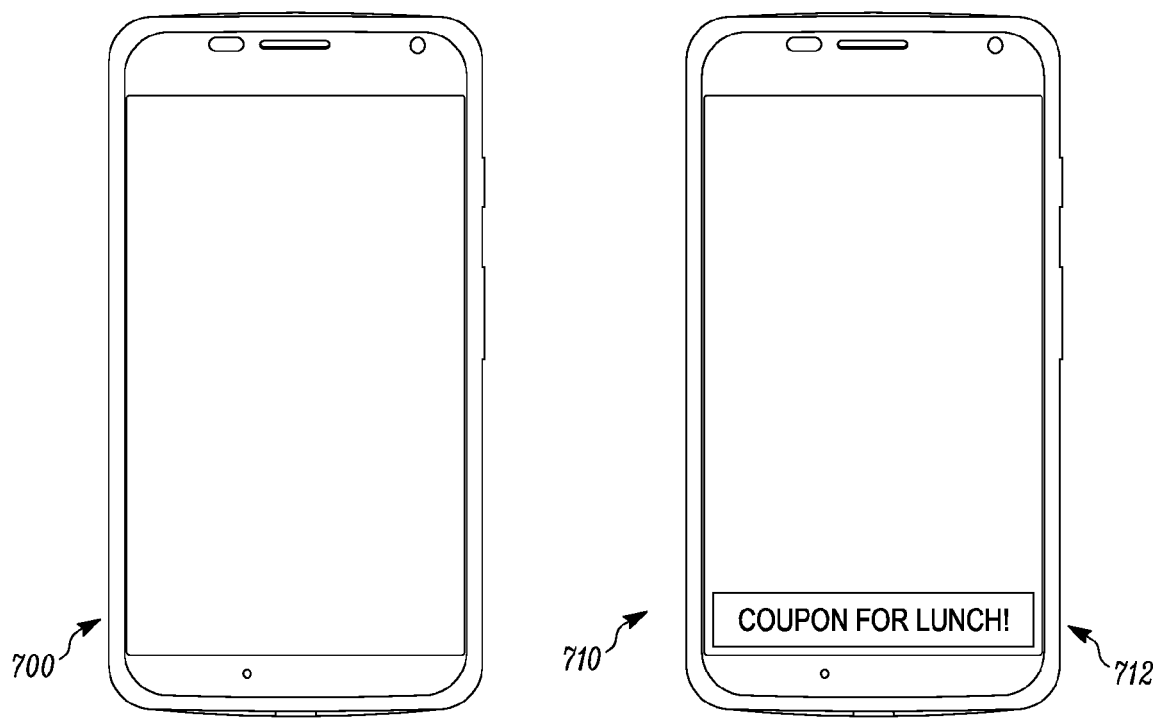
FIG. 7A
FIG. 7B
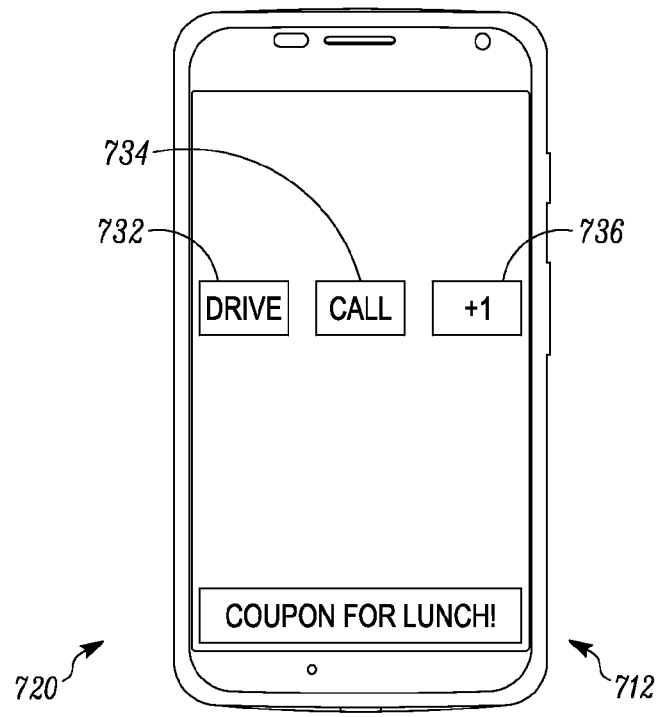
FIG. 7C

| PRIMARY AD ID | SECONDARY AD ID | ACTION 1 | ACTION 2 | ACTION 3 | USER ID | DEVICE MODEL | TIME OF DAY | DEVICE LOCATION | WAKE REASON | VOICE KEYWORD 1 |
|---|---|---|---|---|---|---|---|---|---|---|
| 25729 | 1 | SHARE | JOIN | REMIND | 2536 | DVX | 12:30 | 42 17 20 N, 87 59 45 W | POCKET | LUNCH |
| 25729 | 1 | PIN | REMIND | +1 | 7245 | DVX | 14:22 | 42 17 20 N, 87 59 45 W | POCKET | LUNCH |
| 25729 | 1 | PIN | REMIND | +1 | 1574 | DVX | 7:12 | 42 17 20 N, 87 59 45 W | MOVEMENT | LUNCH |
| 25729 | 2 | CALL | NAVIGATE | SHARE | 3784 | ELX | 4:53 | 42 17 20 N, 87 59 45 W | POCKET | HUNGRY |
| 25729 | 2 | CALL | NAVIGATE | SHARE | 135 | ELX | 22:12 | 42 17 20 N, 87 59 45 W | MOVEMENT | HUNGRY |
| 25729 | 3 | WEB | JOIN | NAVIGATE | 9725 | DVX | 9:44 | 42 17 20 N, 87 59 45 W | MOVEMENT | HUNGRY |
| 25729 | 3 | JOIN | WEB | CALL | 2573 | DVX | 11:15 | 42 17 20 N, 87 59 45 W | MOVEMENT | HUNGRY |
| 25730 | 1 | WEB | - | - | 4567 | DVX | 1:32 | 42 17 20 N, 87 59 45 W | POCKET | GAME |
| 25730 | 1 | WEB | - | - | 7653 | ELX | 8:19 | 42 17 20 N, 87 59 45 W | MOVEMENT | GAME |
| 25730 | 1 | WEB | DOWNLOAD | - | 8653 | DVX | 10:29 | 42 17 20 N, 87 59 45 W | POCKET | GAME |
| 25730 | 1 | WEB | DOWNLOAD | - | 5267 | ELX | 18:34 | 42 17 20 N, 87 59 45 W | POCKET | GAME |
| 25730 | 1 | WEB | DOWNLOAD | SAVE | 9764 | DVX | 16:54 | 42 17 20 N, 87 59 45 W | MOVEMENT | GAME |

FIG. 8A

| FIG. 8A | FIG. 8B |
|---|---|

FIG. 8

| KW 1 TIME BEFORE DISPLAY | VOICE KEYWORD 2 | KW 2 TIME BEFORE DISPLAY | VOICE KEYWORD 3 | KW 3 TIME BEFORE DISPLAY | VIEW DURATION | ACTION TAKEN |
|---|---|---|---|---|---|---|
| 1521 | TACOS | 0 | MEXICAN | 0 | 0 | 0 |
| 0 | TACOS | 0 | MEXICAN | 0 | 0 | 0 |
| 0 | TACOS | 0 | MEXICAN | 0 | 2.2 | 3 |
| 125 | FAST | 0 | LUNCH | 0 | 0 | 0 |
| 0 | FAST | 0 | LUNCH | 0 | 2.9 | 1 |
| 512 | FAST | 0 | LUNCH | 0 | 1.5 | 2 |
| 1021 | FAST | 0 | LUNCH | 672 | 2.3 | 2 |
| 0 | BORED | 527 | APPS | 0 | 0 | 0 |
| 0 | BORED | 0 | APPS | 0 | 0 | 0 |
| 1302 | BORED | 1348 | APPS | 0 | 2.6 | 2 |
| 0 | BORED | 0 | APPS | 0 | 1.9 | 2 |
| 0 | BORED | 0 | APPS | 0 | 0 | 0 |

FIG. 8B

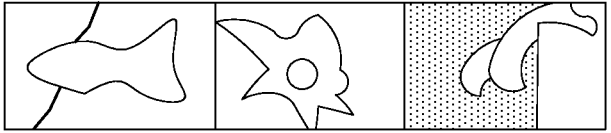
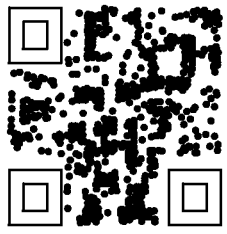
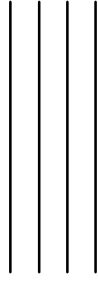
FIG. 9C

METHOD AND APPARATUS FOR KEYWORD GRAPHIC SELECTION

CROSS REFERENCE TO RELATED APPLICATIONS

The present application is related to co-pending and commonly assigned U.S. patent application Ser. No. 13/830,452, filed on 14 Mar. 2013 and U.S. patent application Ser. No. 13/836,987, filed on 15 Mar. 2013, both of which claim priority to each of U.S. Provisional Patent Application No. 61/720,322, filed on 30 Oct. 2012, and U.S. Provisional Patent Application No. 61/736,536, filed on 12 Dec. 2012, and U.S. Provisional Patent Application No. 61/757,690, filed on 28 Jan. 2013, the contents of all of which are hereby incorporated by reference herein.

TECHNICAL FIELD

The disclosure relates to user interaction with an electronic device.

BACKGROUND

The traditional "Notification LED" on an electronic device has lost its usefulness for users who often receive a constant stream of notifications. For such users, the notification LED blinks often and thus becomes "noise" that provides little in the way of useful information and, indeed, an always-blinking LED drowns out important notifications. Additionally, devices employing such notification LEDs foster an operational paradigm of "fidgeting" in which the user must constantly wake the device simply to view each notification. Such operation is both time consuming and cognitively draining. In view of such concerns, and others, it would be advantageous if one or more improved methods of providing notifications to users of electronic devices, and improved electronic devices configured to perform such methods, could be developed.

Interaction with the notification LED is typically performed through manual manipulation of a touch screen display or other input device. While voice recognition applications or modules are also available for user interaction, application processors are needed to execute the voice recognition applications while the electronic device is in an active or awake mode of operation. The awake mode of operation consumes more battery power which may quickly deplete the battery of an electronic device. Additionally, the user must interact with the electronic device to execute voice recognition software on the application processors for the electronic device to be able to detect keywords spoken by the user of the electronic device.

BRIEF DESCRIPTION OF THE DRAWINGS

These and/or other embodiments will become apparent and more readily appreciated from the following description of the embodiments, taken in conjunction with the accompanying drawings of which:

FIGS. 7A, 7B, and 7C are three example views of a display screen of the electronic device of FIG. 1 during operation of the method of FIG. 5 illustrating selected display sessions and selected action icons;

FIG. 8, represented by FIGS. 8A and 8B, is a diagram of one example of user interaction data stored by one or more of the electronic devices of FIG. 1;

DETAILED DESCRIPTION

Figure 1:
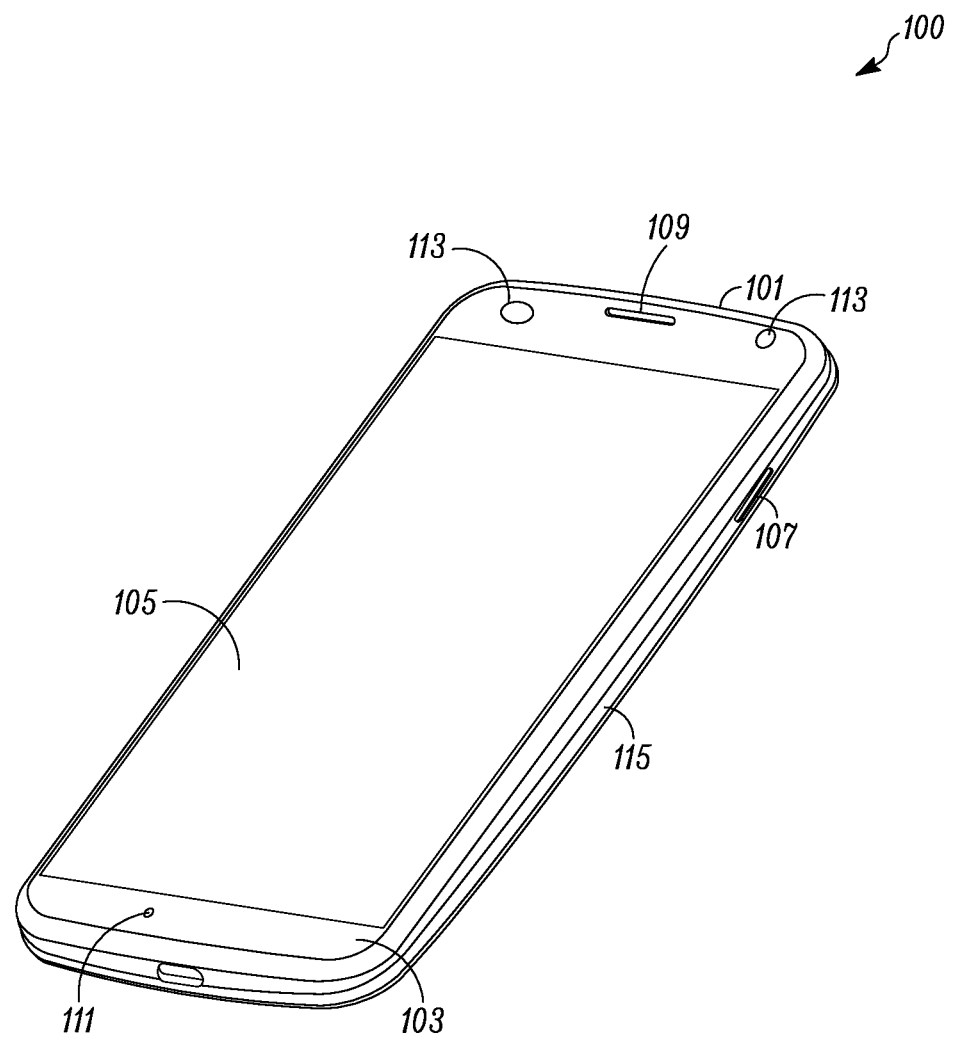
FIG. 1 is a perspective view of an example embodiment of an electronic device in accordance with the present disclosure.

A variety of enhancements can be provided to electronic devices so as to enable to the electronic devices to better provide notifications to users, and to the methods of operation of electronic devices in providing notifications. Although mobile device displays and indeed the application processors of mobile devices are in a powered-down or "off" state much or most of the time (e.g., in a "sleep mode"), so as to save on power consumed by such devices, such an "off" state of the display presents an opportunity for displaying the most relevant information at just the right time. Further, because a user's attention is a limited resource, in addition to showing the right information at the right time, displaying of notifications in this manner during the "off" state could also help reduce the amount of time it takes to access the most important notifications. By giving users the right amount of information at the right time, the users will be better informed to decide whether or not to pick up and actively use (unlock or turn "on") their device—or to simply dismiss such notifications without unlocking their device.

Accordingly, it is possible to allow for ongoing activation of a mobile device display, even while the mobile device application processor and display are technically in a powered-down or "off" state, by implementing Smart Partial OLED display technology and a sensor hub (or other auxiliary processing device) for controlling a display using such technology, rather than using the mobile device application processor, so as to achieve the displaying of notifications in a low-power (or lower-power) manner relative to normal "on" state operation of a display by way of the mobile device application processor. Embodiments operating in this manner can be considered as providing "always-on" operation insofar as, even though the mobile device (or at least the mobile device application processor) is powered-down or off, the display can still be activated to display notifications when appropriate. That is, touch inputs can be received, while the display is in a lower power state that is more akin to an "off" state in terms of power usage, insofar as the display is "on" only periodically or otherwise to a limited extent. Such operation can be advantageous both in terms of reducing the rate of battery depletion, as well as reducing the chance that portions of a display might be overly illuminated for too great of time in a manner that could damage the display.

In at least some embodiments, the display of the "right information at the right time" is achieved by leveraging the Smart Partial OLED display system to display an optimized set of notifications while the screen is "off", where optimization can be achieved for example by way of intelligent prioritization/ranking based on various information such as various inputs/behaviors, and improved notification management. In this manner, the most important contextually-relevant information reaches the user, and particularly can be provided to the user when the user has a need for that information (in such cases, there can also be integration with personal assistant-type applications such as Google Now available from Google, Inc. of Mountain View, Calif.).

Also, in at least some embodiments, the "always-on" operation provides users with a seamless or substantially seamless experience as the users utilize the device and the device transitions between the "screen off" state (lock screen) and the "on" state. In at least some example embodiments, the device comes alive while still in the "off" mode (e.g., where the application processor is still dormant) by showing incoming notifications as they occur, by providing "breathing" alerts on the screen without substantially draining the battery, and by coming alive when the device is picked up off of a surface such as a table. Also, in some example embodiments, the providing of notifications is entirely disabled by the device when the device recognizes a circumstance where the providing of notifications is inappropriate (e.g., when the device is face down, when the device is in a pocket, when it is nighttime, etc.).

Further, in at least some embodiments, the low-power operating capability of the OLED display during the "off" state of the device is further leveraged by operating the display in a manner by which important notifications are shown only on a small part of the screen. In some cases, not only does the display system display an optimized set of notifications while the screen is "off", without significantly impacting battery life, but also the system allows for a select set of user interactions during this state, which also avoid significant impacts upon battery life. Also, in at least some cases, there can further be a continuous, cohesive experience between phone and watch operation. Also, at least some embodiments can provide a user-centric approach to security.

In addition to notifications to a user, advertisements to the user on mobile devices are also common. However, these advertisements are typically placed within applications or the operating systems and thus must be viewed when the user is actively using the mobile device. The advertisement must then compete for the user's attention with the applications or operating system. Because the user is more likely to direct their attention to the application than the advertisement, an advertiser that pays for the advertisement placement is less likely to pay a higher fee for the advertisement's placement. The use of an "always-on" operation for display of graphics or advertisements along with user interaction during their display allows for more targeted advertising and information gathering. The use of an "always-on" voice recognition feature allows for selection of notifications or advertisements without requiring manual interaction by the user.

The present disclosure is generally directed to a method and system for selection of graphics for display to a user. In particular, the disclosure is directed to selecting advertisements on an electronic device for display to the user in a lower-power mode of operation.

The present disclosure describes a method of an electronic device. A touch screen display of the electronic device is actively controlled in a higher-power mode of operation. A set of graphics and a set of stored keywords are received in the higher-power mode of operation. Each graphic of the set of graphics corresponds to one or more keywords of the set of stored keywords. Actively controlling the touch screen display in the higher-power mode of operation is discontinued to enter a lower-power mode of operation. Audio signals are listened for in the lower-power mode of operation. It is detected in the lower-power mode whether any keywords of the set of stored keywords are present in the audio signals. A set of detected keywords present in the audio signals are stored in the lower-power mode of operation. A graphic is selected, in the lower-power mode, from the set of graphics based on a comparison between the set of detected keywords and the set of stored keywords. At least one control signal is provided to the touch screen display in the lower-power mode. In response to the at least one control signal and in the lower-power mode, a first portion of the touch screen display is activated. In response to the at least one control signal and in the lower-power mode, a first portion of the selected graphic is displayed on a first area of the touch screen display that is within the first portion of the touch screen display.

The present disclosure further describes an electronic device. The electronic device includes a receiver configured to receive wireless communication signals, a memory device, a touch screen display, a microphone, at least one application processor configured to control the touch screen display in a higher-power mode of operation, and at least one processing device configured to control the touch screen display in a lower-power mode of operation. The at least one application processor is configured to receive and store a set of graphics and a set of stored keywords in the memory device during the higher-power mode of operation. Each graphic of the set of graphics corresponds to one or more keywords of the set of stored keywords. The microphone is configured to listen, in the lower-power mode of operation, for audio signals within the audible range of the microphone. The at least one processing device is configured to: detect, in the lower-power mode of operation, whether any keywords of the set of stored keywords are present in the audio signals; store, in the lower-power mode of operation, a set of detected keywords present in the audio signals; select, in the lower-power mode of operation, a graphic from the set of graphics based on a comparison between the set of detected keywords and the set of stored keywords; and provide, in the lower-power mode of operation, at least one control signal to the touch screen display. The touch screen display is configured to: activate, in the lower-power mode of operation and in response to the at least one control signal, a first portion of the touch screen display; and display, in the lower-power mode of operation and in response to the at least one control signal, a first portion of the selected graphic on a first area of the touch screen display that is within the first portion of the touch screen display.

Turning to FIG. 1, there is illustrated a perspective view of an example electronic device 100. In the present embodiment, the electronic device 100 can be any type of device capable of providing touch screen interactive capabilities. Examples of the electronic device 100 include, but are not limited to, mobile devices, wireless devices, smart phones, tablet computing devices, personal digital assistants, personal navigation devices, touch screen input devices, touch or pen-based input devices, portable video or audio players, as well as any of a variety of other electronic devices. It is to be understood that the electronic device 100 may take the form of a variety of form factors, such as, but not limited to, bar, tablet, flip/clam, slider and rotator form factors.

In the present example embodiment shown in FIG. 1, the electronic device 100 has a housing 101 comprising a front surface 103 which includes a touch screen display (that is a visible display) 105 that, together with certain other features discussed below, constitutes a user interface. In the present example, the touch screen display 105 is a touch screen including a touch-sensitive surface that overlays a display surface forming part of (or that is positioned just underneath or inwardly of) the front surface 103. In the present embodiment, the touch screen display 105 (and particularly the display surface thereof) employs organic light-emitting diode (OLED) technology. Further, the user interface of the electronic device 100 as shown can also include one or more input keys 107. Examples of the input key or keys 107 include, but are not limited to, keys of an alpha or numeric (e.g., alphanumeric) keypad (or other keyboard), physical keys, touch-sensitive surfaces, mechanical surfaces, multipoint directional keys, and side buttons or keys. Further as shown, the electronic device 100 can also comprise a speaker 109 and microphone 111 for audio output and input, respectively, along the front surface 103 (or other outer surfaces of the device).

Notwithstanding the particular features shown in FIG. 1, in an alternate embodiment, the electronic device can include other features. For example, in place of the touch screen display, in an alternate embodiment the electronic device can employ a touch-sensitive surface supported by the housing 101 that does not overlay (or is not overlaid by) any type of display. Indeed, although FIG. 1 shows particularly example display and user interface features, it is to be understood that the electronic device 100 can include a variety of other combinations of display and user interface features depending upon the embodiment.

Additionally as shown in FIG. 1, the electronic device 100 includes one or more sensors 113, a number of which are shown to be positioned at or within an exterior boundary of the housing 101 (and can be supported on or within the housing 101). More particularly, as illustrated by FIG. 1, in the present embodiment the sensor or sensors 113 can be positioned at the front surface 103, another surface (such as one or more side surfaces 115) of the exterior boundary of the housing 101, or both. In the present embodiment, at least some of the sensors 113 (whether at the exterior boundary or within the exterior boundary, i.e., internal to the housing) are configured to detect one or more predetermined environmental conditions associated with an environment external or internal to the housing. Further examples of the sensors 113 are described below in reference to FIG. 2.

Figure 2:
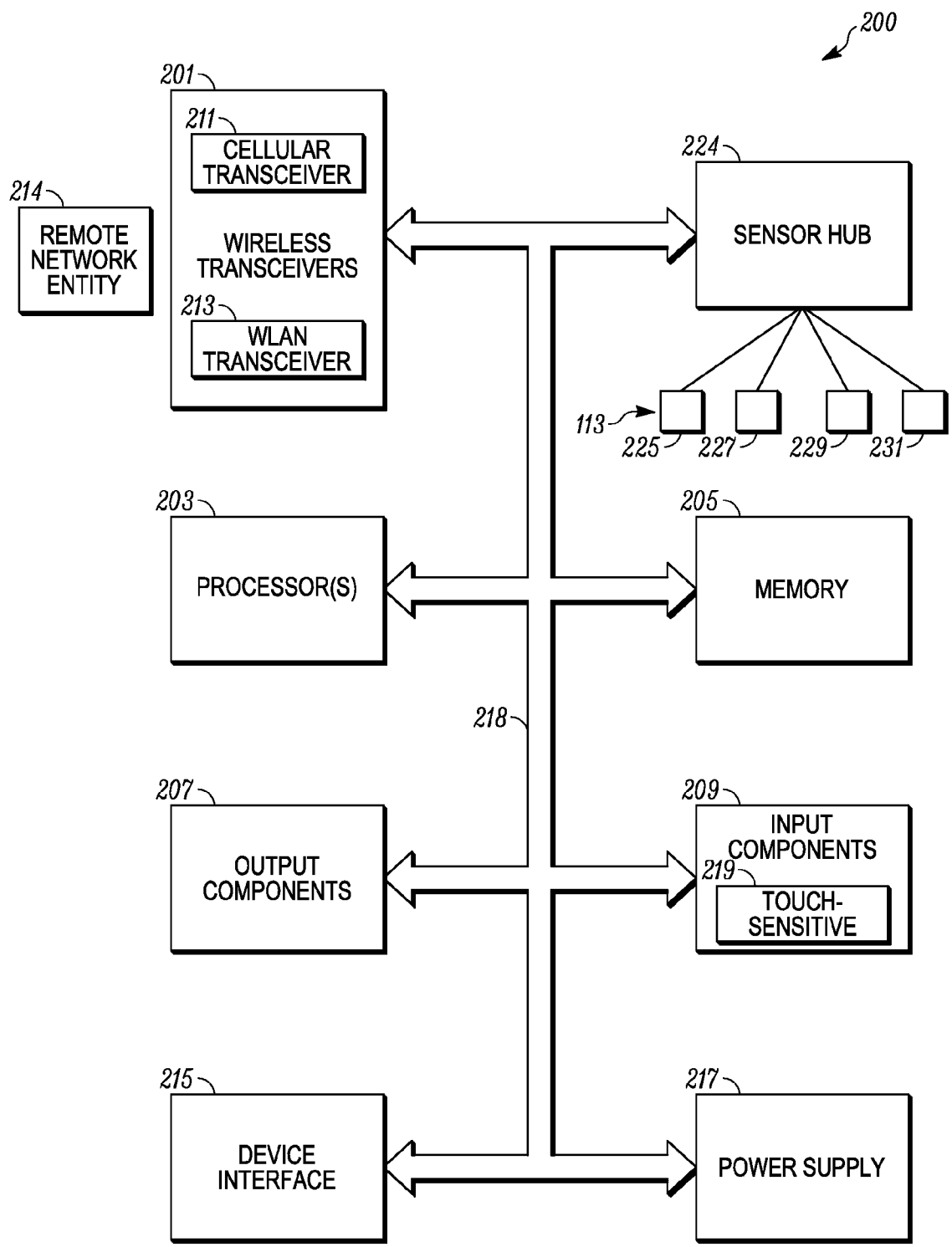
FIG. 2 is a block diagram representing example components of the electronic device of FIG. 1.

Referring to FIG. 2, there is shown a block diagram representing example components (e.g., internal components) 200 of the electronic device 100 of FIG. 1. In the present embodiment, the components 200 include one or more wireless transceivers 201, one or more processors 203, one or more memories 205, one or more output components 207, and one or more input components 209. As already noted above, the electronic device 100 includes a user interface, including the touch screen display 105 that comprises one or more of the output components 207 and one or more of the input components 209. Also as already discussed above, the electronic device 100 includes a plurality of the sensors 113, several of which are described in more detail below. In the present embodiment, the sensors 113 are in communication with (so as to provide sensor signals to or receive control signals from) a sensor hub 224.

Further, the components 200 include a device interface 215 to provide a direct connection to auxiliary components or accessories for additional or enhanced functionality. In addition, the internal components 200 include a power source or supply 217, such as a portable battery, for providing power to the other internal components and allow portability of the electronic device 100. As shown, all of the components 200, and particularly the wireless transceivers 201, processors 203, memories 205, output components 207, input components 209, sensor hub 224, device interface 215, and power supply 217, are coupled directly or indirectly with one another by way of one or more internal communication link(s) 218 (e.g., an internal communications bus).

Further, in the present embodiment of FIG. 2, the wireless transceivers 201 particularly include a cellular transceiver 211 and a Wi-Fi transceiver 213. Although in the present embodiment the wireless transceivers 201 particularly include two of the wireless transceivers 211 and 213, the present disclosure is intended to encompass numerous embodiments in which any arbitrary number of (e.g., more than two) wireless transceivers employing any arbitrary number of (e.g., two or more) communication technologies are present. More particularly, in the present embodiment, the cellular transceiver 211 is configured to conduct cellular communications, such as 3G, 4G, 4G-LTE, vis-à-vis cell towers (not shown), albeit in other embodiments, the cellular transceiver 211 can be configured to utilize any of a variety of other cellular-based communication technologies such as analog communications (using AMPS), digital communications (using CDMA, TDMA, GSM, iDEN, GPRS, EDGE, etc.), or next generation communications (using UMTS, WCDMA, LTE, IEEE 802.16, etc.) or variants thereof.

By contrast, the Wi-Fi transceiver 213 is a wireless local area network (WLAN) transceiver configured to conduct Wi-Fi communications in accordance with the IEEE 802.11(a, b, g, or n) standard with access points. In other embodiments, the Wi-Fi transceiver 213 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 213 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth, or other wireless communication technologies such as infrared technology. Although in the present embodiment each of the wireless transceivers 201 serves as or includes both a respective transmitter and a respective receiver, it should be appreciated that the wireless transceivers are also intended to encompass one or more receiver(s) that are distinct from any transmitter(s), as well as one or more transmitter(s) that are distinct from any receiver(s). In one example embodiment encompassed herein, the wireless transceiver 201 includes at least one receiver that is a baseband receiver.

Exemplary operation of the wireless transceivers 201 in conjunction with others of the components 200 of the electronic device 100 can take a variety of forms and can include, for example, operation in which, upon reception of wireless signals (as provided, for example, by remote device(s)), the internal components detect communication signals and the transceivers 201 demodulate the communication signals to recover incoming information, such as voice or data, transmitted by the wireless signals. After receiving the incoming information from the transceivers 201, the processors 203 format the incoming information for the one or more output components 207. Likewise, for transmission of wireless signals, the processors 203 format outgoing information, which can but need not be activated by the input components 209, and conveys the outgoing information to one or more of the wireless transceivers 201 for modulation so as to provide modulated communication signals to be transmitted. The wireless transceiver(s) 201 convey the modulated communication signals by way of wireless (as well as possibly wired) communication links to other devices (e.g., remote devices). The wireless transceivers 201 in one example allow the electronic device 100 to exchange messages with remote devices, for example, a remote network entity 214 of a cellular network or WLAN network. Examples of the remote network entity 214 include an application server, web server, database server, content server, or other network entity accessible through the wireless transceivers 201 either directly or indirectly via one or more intermediate devices or networks (e.g., via a WLAN access point, the Internet, LTE network, or other network).

Depending upon the embodiment, the output and input components 207, 209 of the components 200 can include a variety of visual, audio, or mechanical outputs. For example, the output device(s) 207 can include one or more visual output devices such as a cathode ray tube, liquid crystal display, plasma display, video screen, incandescent light, fluorescent light, front or rear projection display, and light emitting diode indicator, one or more audio output devices such as a speaker, alarm, or buzzer, or one or more mechanical output devices such as a vibrating mechanism or motion-based mechanism. Likewise, by example, the input device(s) 209 can include one or more visual input devices such as an optical sensor (for example, a camera lens and photosensor), one or more audio input devices such as a microphone, and one or more mechanical input devices such as a flip sensor, keyboard, keypad, selection button, navigation cluster, touch pad, capacitive sensor, motion sensor, and switch.

As noted, the user interface and particularly the touch screen display 105 of the electronic device 100 of FIG. 1 can be considered to constitute or include both one or more of the input components 209, particularly a touch-sensitive input component 219 shown in FIG. 2, and one or more of the output components 207. Further, it should be appreciated that the operations that can actuate one or more of the input devices 209 can include not only the physical pressing/activating of the touch screen display 105 or buttons or other actuators of the user interface or otherwise, but can also include, for example, opening the electronic device 100 (if it can take on open or closed positions), unlocking the electronic device 100, moving the electronic device to actuate a motion, moving the electronic device to actuate a location positioning system, and operating the electronic device.

In the present embodiment, one or more of the input components 209, such as one or more input components encompassed by the user interface such as the touch-sensitive component 219 shown in FIG. 1, can produce an input signal in response to detecting a predetermined gesture. In this regard, the touch-sensitive component 219 can be considered a gesture sensor and can be or include, for example, a touch-sensitive sensor having a touch-sensitive surface substantially parallel to the display. The touch-sensitive sensor can include at least one of a capacitive touch sensor, a resistive touch sensor, an acoustic sensor, an ultrasonic sensor, a proximity sensor, or an optical sensor.

As mentioned above, the components 200 also can include one or more of various types of the sensors 113. Although the sensors 113 are for the purposes of FIG. 2 shown to be distinct from the input devices 209, the sensors can also be considered as being encompassed among the input devices 209. In alternate embodiments, one or more of the input devices can be encompassed among the sensors, one or more of the sensors can be considered distinct from the input devices, one or more of the input devices can be considered distinct from the sensors, or all of the sensors can be considered distinct from all of the input devices and vice-versa.

With respect to the sensors 113 particularly shown in FIG. 2, these particularly include various sensors 225 through 231 that are examples of sensors that can be included or utilized by the electronic device 100. As already noted, as shown in FIG. 2, the various sensors 225-231 in the present embodiment can be controlled by the sensor hub 224, which can operate in response to or independent of the processor(s) 203. The various sensors 225 through 231 can include, but are not limited to, one or more power sensors 225, one or more temperature sensors 227, one or more pressure sensors 228, one or more moisture sensors 229, and one or more ambient noise sensors 231.

Further in regard to the present embodiment, and as discussed further below, it should be understood that the sensor hub 224, in addition to controlling the various sensors 225 through 231, also serves to control operation of the touch screen display 105 of the user interface (and the functionality that supports it) when the electronic device 100 and particularly the touch screen display is considered to be "off", including times at which the electronic device is operating in an intermediate mode or "breathing mode" of operation as described below. This is in contrast to times at which the electronic device 100 is awake or "on", during which times the touch screen display 105 of the user interface (and the functionality that supports it) is under the control of the processor(s) 203, which can be considered application processor(s). This manner of operation involving control by the sensor hub 224 at times when the electronic device is "off" is advantageous because the sensor hub consumes substantially less power than the processors 203 therefore operation under the control of the sensor hub can be provided with substantially less battery drain than operation under the processor(s) 203.

Although the various sensors 225 through 231 are shown in FIG. 2, in other embodiments one or more of numerous other types of sensors can also be included among the sensors 113 including, for example, one or more motion sensors, including for example one or more accelerometers or Gyro sensors (not shown), one or more light sensors, one or more proximity sensors (e.g., a light detecting sensor, an ultrasound transceiver or an infrared transceiver), one or more other touch sensors, one or more altitude sensors, one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the electronic device 100.

With respect to the processor(s) 203, the processor(s) can include any one or more processing or control devices such as, for example, a microprocessor, microcomputer, application-specific integrated circuit, etc. The processors 203 can generate commands, for example, based on information received from the one or more input components 209. The processor(s) 203 can process the received information alone or in combination with other data, such as information stored in the memories 205. Thus, the memories 205 of the components 200 can be used by the processors 203 to store and retrieve data.

Further, the memories (or memory portions) 205 of the components 200 can encompass one or more memory devices of any of a variety of forms (e.g., read-only memory, random access memory, static random access memory, dynamic random access memory, etc.), and can be used by the processors 203 to store and retrieve data. In some embodiments, one or more of the memories 205 can be integrated with one or more of the processors 203 in a single device (e.g., a processing device including memory or processor-in-memory (PIM)), albeit such a single device will still typically have distinct portions/sections that perform the different processing and memory functions and that can be considered separate devices. The data that is stored by the memories 205 can include, but need not be limited to, operating systems, applications, and informational data.

Each operating system includes executable code that controls basic functions of the electronic device 100, such as interaction among the various components included among the components 200, communication with external devices or networks via the wireless transceivers 201 or the device interface 215, and storage and retrieval of applications and data, to and from the memories 205. Each application includes executable code that utilizes an operating system to provide more specific functionality, such as file system service and handling of protected and unprotected data stored in the memories 205. Such operating system or application information can include software update information (which can be understood to potentially encompass updates to either application(s) or operating system(s) or both). As for informational data, this is non-executable code or information that can be referenced or manipulated by an operating system or application for performing functions of the electronic device 100.

It is to be understood that FIG. 2 is provided for illustrative purposes only and for illustrating components of an electronic device in accordance with various embodiments, and is not intended to be a complete schematic diagram of the various components required for an electronic device. Therefore, an electronic device can include various other components not shown in FIG. 2, or can include a combination of two or more components or a division of a particular component into two or more separate components, and still be within the scope of the disclosed embodiments.

The electronic device 100 in one embodiment is configured to proceed among different operational modes or states, mainly, a "fully awake" or "on" mode of operation during which the processors 203 are operating (that is, the application processors are up and running), an "off" mode of operation, and an "intermediate" mode of operation during which "breathing" and "peeking" processes occur or can occur. Although in the present embodiment the processors 203 are off or powered-down during the off mode and intermediate mode of operation (by contrast to operation in the fully awake mode, during which the processors 203 are up and running), as will be described further below it is still possible for the electronic device 100 to operate during one or both of the off mode and intermediate mode in manners that involve some display functionality by the touch screen display 105 (including potentially both outputting of information and receiving of inputs). Such operation of the touch screen display 105 during the intermediate mode or off mode is achieved by virtue of control functionality provided by the sensor hub 224.

It should further be appreciated that, generally speaking, operation in the fully awake mode is associated with a normal power mode of the processors 203 (application processors) or a substantially active mode of those processors. By contrast, the intermediate mode of operation and off mode of operation are associated with a low power (or even completed powered-off) mode of the processors 203 (application processors) or a substantially inactive mode of those processors. Given the above, the intermediate mode of operation can also be referred to as an "Always on Display" mode (AoD mode), "sleep" mode (or the off mode potentially can also be encompassed generally within the "sleep" mode), or lower-power mode of operation, in contrast to the fully awake mode, which can be referred to as a "non-sleep" mode or higher-power mode of operation.

Additionally as will be described further below, in at least some embodiments disclosed herein, one or more notifications can be displayed by the electronic device 100 in a "non-sleep" mode such as the fully awake mode and also one or more notifications can be displayed by the electronic device in a "sleep" mode such as the intermediate or AoD mode (including submode portions thereof as described). In at least some such embodiments, the notifications provided in the fully awake mode or "non-sleep" mode are notifications received during operation in that mode, and that are displayed by way of activation of the entire, or substantially the entire, display screen (e.g., full screen information is displayed, where the full screen information includes data corresponding to substantially all pixels capable of being displayed by the display). Further in such embodiments, in contrast, the notifications provided in the intermediate mode or "sleep" mode are notifications received during operation in that mode, and that are displayed by way of activation of only a portion or portions of the display screen (particularly portion(s) that are substantially less than the entire display screen or display substantially less that the full screen information, that is, information corresponding to less or substantially less than all pixels capable of being displayed by the display).

Figure 3:
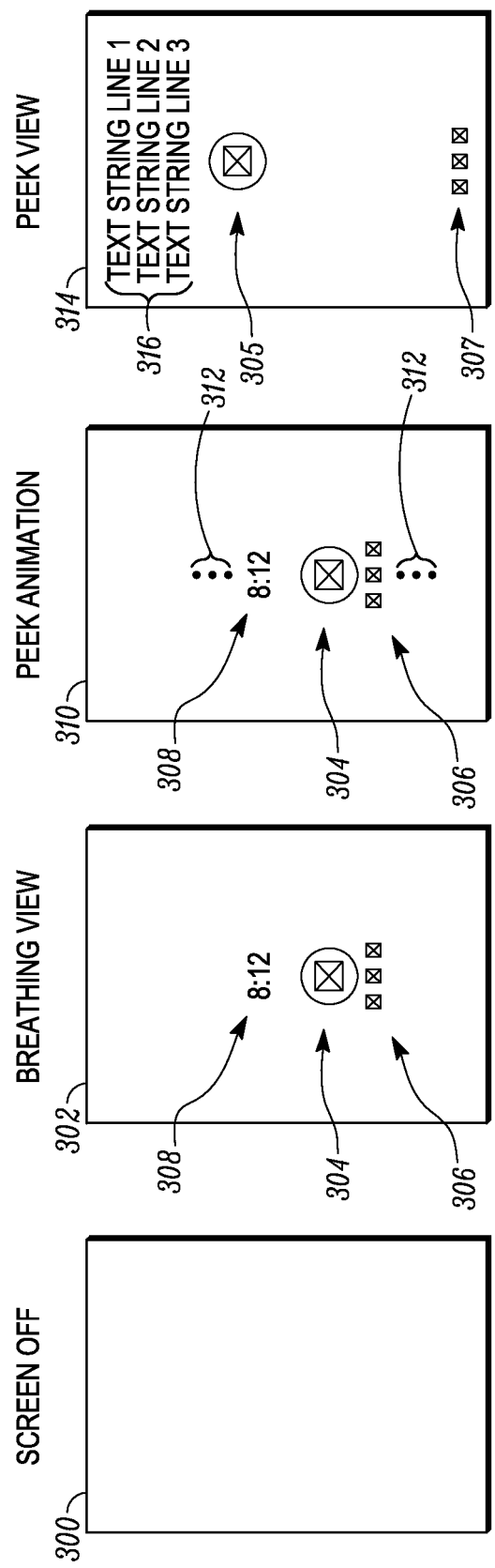
FIGS. 3A, 3B, 3C, and 3D are four example views of a display screen of the electronic device of FIG. 1 during four different points of operation of a method for display.

Turning to FIGS. 3A, 3B, 3C, and 3D, respectively, first, second, third, and fourth example views of the touch screen display 105 of the electronic device 100 are shown that are intended to illustrate example operation of the touch screen display in displaying images or graphics for a user interaction. FIG. 3A particularly shows a blank image 300 that appears when the touch screen display 105 is completely off.

By contrast, FIG. 3B shows a breathing view image 302 that, rather than being blank, instead includes one or more image portions that are displayed by the touch screen display 105, and which in the present example particularly include an icon 304 that can constitute a hit area that can be touched by a user during operation in the intermediate mode, additional icons 306 that also can constitute an additional hit area (or areas), and a time display 308. The breathing view image 302 does not remain consistently on at all times during operation in the intermediate mode, but rather periodically becomes visible and then disappears (at which times the touch screen display 105 again takes on the blank image 300 of FIG. 3A.

Next, with respect to FIG. 3C, a peek animation image 310 is illustrated. As shown, the peek animation image 310 also includes one or more image portions that are displayed by the touch screen display 105, and more particularly in this embodiment these one or more image portions include not only all of the image portions shown in FIG. 3B (namely, icon 304, icons 306 and time display 308) but also additionally include animation features 312, which in the present example include upper and lower (that is, above the time display 308 and below the icons 306) vertically-extending columns of three dots. As further discussed below, the animation features 312 particularly are displayed by the touch screen display 105 during transitioning between a time during the intermediate mode at which a touch can be received (e.g., a time at which the breathing view image 302 shown in FIG. 3B is displayed), and a time at which the peek view mode has been fully entered and a peek view image such as an example image shown in FIG. 3D is displayed.

Additionally, with respect FIG. 3D, the peek view image 314 shown therein is an example of an image that can be displayed by the touch screen display 105 once peek view mode has been entered. As shown, the peek view image 314 no longer includes the exact same arrangement of image portions shown in the peek animation view 310, albeit some of the image portions are the same in terms of their respective appearances. More particularly, the peek view image 314 in contrast to the peek animation image 310 no longer has the animation features 312 or time display 308, but continues to have an icon 305 identical in appearance to the icon 304 and icons 307 identical in appearance to the icons 306, except insofar as the icon 305 is now at a location that is moved upwards relative to the location of the icon 304 in the peek animation view (above the location of the uppermost dot of the upper column of dots of the animation features) and the icons 307 are now at a location that is moved vertically downward relative to their previous location in the peek animation view (below the location of the lowermost dot of the lower column of dots of the animation features).

Further, in the peek view image 314, one or more (in this example, three) text strings lines 316 are also displayed, above the icon 305. The text string lines 316 can include message information or information corresponding to one or more past notifications received by the electronic device 100. The display of these text string lines thus allows the user to "peek" at the notifications that have been received (e.g., recently received) by the electronic device 100, and is therefore the feature of this manner of operation giving rise to the "peek view mode" terminology used herein.

Referring additionally to FIGS. 4A, 4B, 4C, and 4D, first, second, third, and fourth additional views 400, 402, 410, and 414, are shown, respectively. The first, second, third, and fourth views 400, 402, 410, and 414 respectively encompass the blank, breathing view, peek animation view, and peek view images 300, 302, 310, and 314 that are shown in FIGS. 3A, 3B, 3C, and 3D, respectively, but also show those images in combination with illustrations of a user—particularly a finger 412 of the user's hand—interacting with those images. Because it is envisioned that the finger 412 of the user has not yet approached the touch screen display in the case of the blank image 300 and breathing view image 302, the first additional view 400 of FIG. 4A merely again shows the blank image 300, and the second additional view 402 of FIG. 4B merely again shows the breathing view image 302. By contrast, with respect to the third additional view 410 of FIG. 4C, there it is envisioned that the user has already touched the touch screen display 105 with the user's finger 412 and this has given rise to display of the peek animation view 310. In particular, it should be noted that the finger 412 is touching on the icon 304, which constitutes one of the hit areas on the touch screen display 105 in this example. Further, it is because of (in response to) the user's finger 412 touching the hit area that animation features 312 are shown to have appeared.

Figure 4:
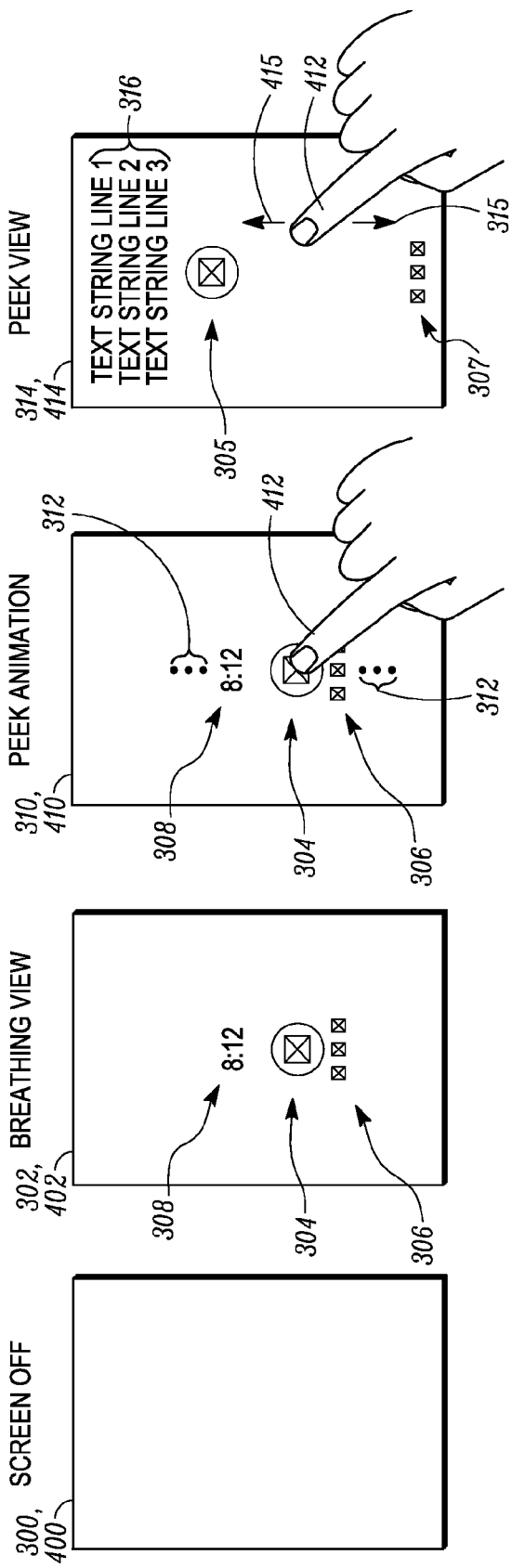
FIGS. 4A, 4B, 4C, and 4D respectively show the example views of FIGS. 3A, 3B, 3C, and 3D of the display screen, respectively, in combination with illustrations of a user interacting with the display screen.

Finally, at FIG. 4D, the fourth additional view 414 shows the peek view image 314 of FIG. 3D and also again shows the user's finger 412 to still be proximate to (touching) the touch screen display 105. As represented by arrows 415, while in the peek view mode of operation, the user can further provide a gesture (or gesture portion) so as to actuate the electronic device 100 to perform one of several different actions or transition to any of several different modes. In the present example, gestural activation of the electronic device 100 in this regard particularly is not accomplished until, in addition to originally touching one of the hit areas (again, in this example, one of the icons 304 and 306) during the intermediate mode of operation, the user then further: (i) continues to continuously touch that hit area during the transitioning from the intermediate mode to the peek view mode (e.g., continues to touch one of the icons 304, 306 as the touch screen display transitions from the breathing view 302 to the peek animation view 310 and ultimately to the peek view 314); (ii) then manipulates the finger 412 to slide upward or downward (e.g., in accordance with either of the arrows 415 of FIG. 4D) until the finger reaches an appropriate one of the image portions of the peek view image corresponding to the hit area that was originally touched (e.g., reaches one of the icons 305, 307 as shown in the peek view 314), and (iii) then releases the hit area by removing the finger 412 from the touch screen display.

Turning to FIGS. 5, 7A, 7B, and 7C, a flowchart for a method 500 illustrates one embodiment of a method for selection of a display session by the electronic device 100. FIGS. 7A, 7B, and 7C are three example views of the touch screen display 105 during operation of the method shown in FIG. 5. The display session in one example represents a query to the user of the electronic device 100, such as a survey or other prompt for information. In another example, the display session represents a display of a graphic to the user of the electronic device 100, such as an advertisement or informational message. Other display sessions will be apparent to those skilled in the art. A display session in one example includes a preconfigured sequence of graphics, for example, a survey may include a preconfigured sequence of graphics with questions and corresponding hit areas for answers. In another example, display session information for a display session comprises a set of graphics from which the sensor hub 224 selects a graphic for display at various times during the display session. The display session information may further comprise action icons with corresponding action indications.

User interaction with the display session occurs, at least in part, during the intermediate or lower-power mode of operation of the electronic device 100. Accordingly, the user has fewer distractions (e.g., applications or the operating system) from the query or graphic. Examples of user interaction by the user include viewing or providing a touch input to the touch screen display 105, pressing an input key 107, providing an audio or voice input for the microphone 111, or providing a gesture input (e.g., shaking the electronic device 100).

As described above, the processor 203 actively controls (502) the touch screen display 105 during the higher-power mode of operation. During the higher-power mode of operation, the processor 203 optionally sends (503) user interaction data, as described herein, to the remote network entity 214 (e.g., a content server). The processor 203 optionally receives (504) display session information for at least one display session during the higher-power mode of operation. In one example, the processor 203 receives display session information based on the user interaction data sent to the remote network entity 214. The display session information comprises at least one of a graphic (e.g., text, images, icons, animated image, video, or a combination thereof), portion of a graphic, graphic fee, action indication, action icon, keyword, category, trigger data, or other information for a display session (e.g., a survey or advertisement). In this case, the processor 203 stores the display session information in the memory 205 for subsequent access by the sensor hub 224 or other components of the electronic device 100. In alternative implementations, the display session information is preconfigured within the electronic device 100 (e.g., during manufacture or initialization) or stored on a separate memory card (e.g., a solid state memory card) which is then loaded into the electronic device 100.

The electronic device 100 in one implementation is configured to obtain updates for the display session information, for example, as part of sending (503) the user interaction data and receiving (504) the display session information. The electronic device 100 in one example obtains the updates at predetermined times (e.g., 2:00 pm, 4:00 pm, etc.), predetermined intervals (e.g., every hour), or when other criteria are met, such as when the electronic device 100 is not in active use by the user or utilization of the electronic device 100 (e.g., utilization of the processor 203 or wireless transceivers 201) is below an activity threshold. In another example, the electronic device 100 obtains the updates upon the occurrence of an event or signal, such as receiving a push notification from the remote network entity 214. In yet another example, the electronic device 100 obtains updates upon a change in mode of operation for the electronic device 100, for example, upon entering the higher-power mode of operation. Other times, schedules, events, or signals to cause an update will be apparent to those skilled in the art. The electronic device 100 in one example obtains the updated display session information through the wireless transceivers 201. In another example, the electronic device 100 obtains the updated display session information by replacement of a memory card.

During the higher-power mode of operation, the processor 203 is configured to discontinue (506) actively controlling the touch screen display 105 to enter the lower-power mode of operation (e.g., the intermediate mode). Entry to the lower-power mode is based on a lack of user activity, a display timeout, a button press, or other criteria that may be used to trigger the electronic device 100 to "sleep," as will be apparent to those skilled in the art. Referring to FIG. 7A, the touch screen display 105 is shown as a blank image 700 upon entering the lower-power mode of operation, analogous to the blank image 300.

Figure 6:
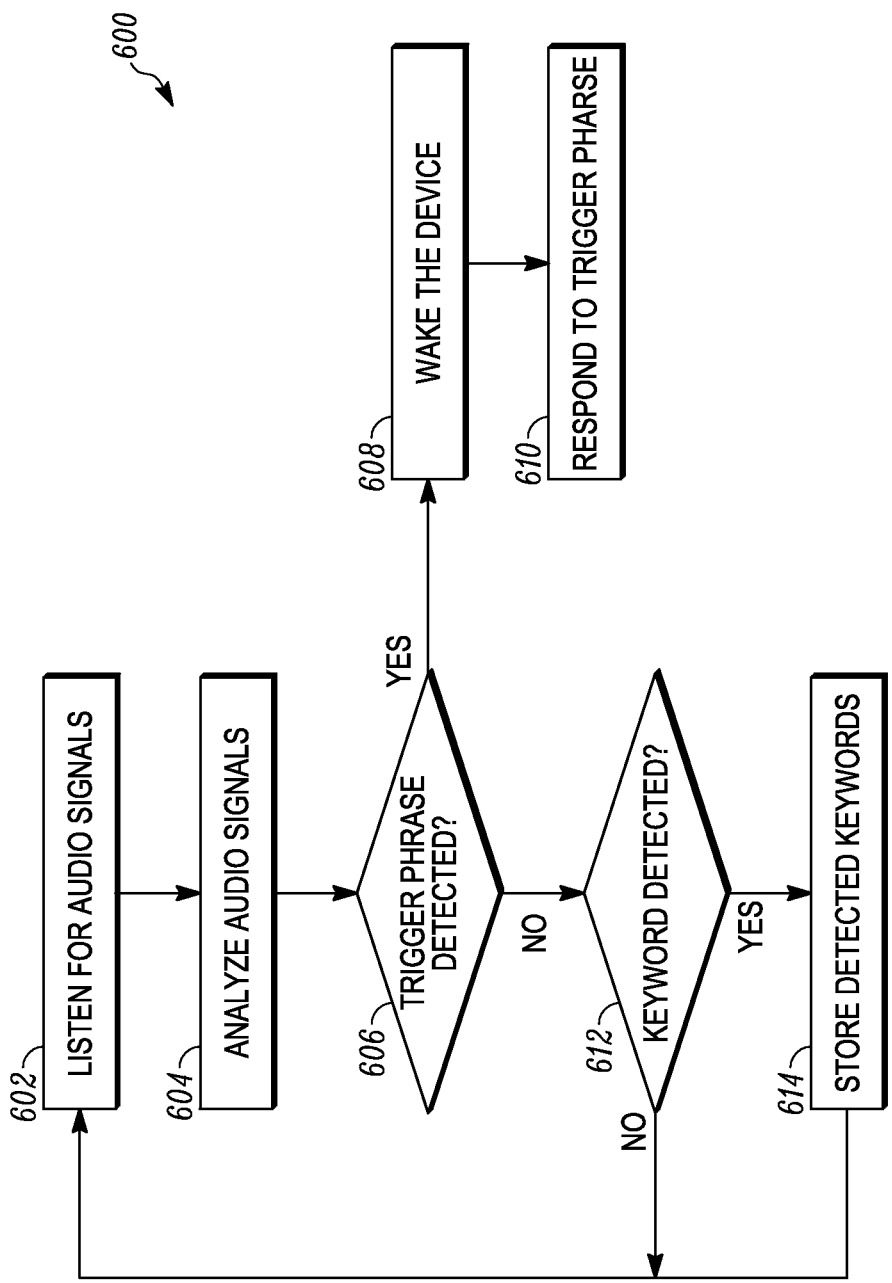
FIG. 6 is a flowchart illustrating one embodiment of a method for storing detected keywords by the electronic device of FIG. 1.

During the lower-power mode of operation, the sensor hub 224 is configured to monitor (508) a sensor input from at least one of the sensors 113. Referring to FIG. 6, a flowchart for a method 600 illustrates one embodiment of a method for storing detected keywords by the electronic device 100. The sensor hub 224 in one example performs the method 600 as part of monitoring (508) the sensor inputs. The sensor hub 224 listens (602) for audio signals within audible range while in the lower-power mode of operation, for example, through the microphone 111. The sensor hub 224 analyzes (604) the audio signals in the lower-power mode to determine whether a trigger phrase or keyword is present in the audio signals. Alternatively, the microphone 111 may listen and analyze the audio signals. If a trigger phrase is detected (YES at 606), the sensor hub 224 is configured to wake the electronic device 100 (e.g., enter the higher-power mode of operation) and to respond (610) to the trigger phrase. Accordingly, the trigger phrase is specific to an action that a user wishes the electronic device 100 to perform in the higher-power mode of operation. Examples of trigger phrases include "OK, Google Now" which may be followed by additional commands or parameters for the action.

As described above, the display session information may comprise at least one of a graphic, action indication, action icon, or keyword. In one example, the display session information comprises a set of graphics (e.g., for a set of display sessions) and a set of stored keywords. In this case, each graphic of the set of graphics corresponds to one or more keywords of the set of stored keywords. At least one stored keyword of the set of stored keywords may include a phrase of multiple words (e.g., "jelly bean" or "ice cream sandwich"). In one example, a first display session corresponds to an advertisement for tickets to a basketball game. The first display session (or individual graphics of the display session) in this case may correspond to keywords such as "Basketball", "Playoffs", or "Game". In another example, a second display session corresponds to an advertisement for an airline with corresponding keywords: "Airline", "Travel", "Trip", or "Flight". In yet another example, a third display session corresponds to weather information (e.g., a graphic with a weather forecast) with corresponding keywords: "Weather", "Temperature", "Rain", "Cold", or "Forecast".

The sensor hub 224 is configured to detect (612) whether any keywords of the set of stored keywords are present in the audio signals. If no keywords have been detected (NO at 612), the sensor hub 224 continues listening (602) for audio input. If one or more keywords are detected (YES at 612), the sensor hub 224 stores (614) a set of detected keywords that are present in the audio signals. The detected keywords of the set of detected keywords correspond to at least one of a detection time (e.g., the time when the keyword was detected) or a detection count (e.g., a number of times the keyword has been detected).

Referring back to FIG. 5, based on the monitoring and while still in the lower-power mode, the sensor hub 224 is configured to select (510) a display session from the received display session information. The sensor hub 224 selects a display session based on at least one of trigger data or keywords associated with the display session (or graphics within the display session), a user profile associated with the electronic device 100, a location associated with the electronic device 100, proximity to a predetermined location (e.g., a restaurant, concert venue, sales kiosk), a time of day associated with the electronic device 100, or a selected action indication from a previous display session. The sensor hub 224 in one example is configured to select a graphic (e.g., of a display session) from the set of graphics in the display session information based on a comparison between the set of detected keywords and the set of stored keywords. Instead of performing the graphic selection at a given time, in another embodiment the sensor hub 224 maintains the set of graphics in a priority list based on the match indicator and the recentness indicator, both of which are described below. The sensor hub 224 thus updates the priority list "in the background." The selected display session thus corresponds to a highest priority graphic of the priority list upon the display trigger.

The sensor hub 224 in one example selects the display session or graphic based on a match indicator. The sensor hub 224 determines a match indicator that indicates a number of keywords that match between the set of detected keywords and the set of stored keywords. Using the above-mentioned examples, a user may say: "If the forecast for rain and cold weather is accurate, I will not go to the playoffs game on Thursday." In this case, the first display session has two keyword matches ("playoffs" and "game") while the third display session has four keyword matches ("forecast", "rain", "cold", "weather"). The sensor hub 224 selects the display session or graphic with a highest match indicator from the set of graphics, in this case, the third display session for the weather information. The match indicator may be further incremented when a detection count for a keyword is greater than one, as will be appreciated by those skilled in the art.

In another example, the sensor hub 224 determines a recentness indicator that indicates an elapsed time since the detection time for each detected keyword. The sensor hub 224 in this case selects the display session or graphic based on the match indicator and the recentness indicator. In one example, the sensor hub 224 selects the display session with a lowest recentness indicator (e.g., a most recently spoken keyword). Using the above-mentioned examples, the "playoffs" and "game" keywords are detected more recently than the keywords for the weather information (e.g., occurring after them) and in this case, the sensor hub 224 selects the advertisement for tickets to the basketball game. In a further example, the sensor hub 224 combines the match indicator with the recentness indicator to select the display session, for example, using a mathematical weighting system.

In yet another example, the display session information includes at least one graphic fee. The graphic fee corresponds to at least one of a graphic, a set of graphics, a keyword that corresponds to a graphic, or a display session. The graphic fee in one example indicates a fee paid by an advertiser for a keyword or display session. The sensor hub 224 in one example selects the graphic with a highest graphic fee for a stored keyword that matches a detected keyword.

The electronic device 100 in one example determines a total advertisement fee charged for a display session (e.g., the advertisement). The total advertisement fee may be based on the detected keywords which triggered the selection of that display session. The electronic device 100 may use additional factors such as a view duration or a selected action indication for the display session to determine the total advertisement fee. For example, a longer view duration may result in a higher total advertisement fee. In another example, an action indication corresponding to a phone call has a higher total advertisement fee than an action indication for an application download. In another embodiment, the remote network entity 214 determines the total advertisement fee based on the received user interaction data. The graphic fee may be used as a factor in the mathematical weighting system for the combination of the match indicator and the recentness indicator.

The graphic fee in one example is selected based on a bidding system of the remote network entity 214. One or more of a plurality of advertisers place a bid on a keyword. In one example, the remote network entity 214 sets a highest bid as the graphic fee and reserves the keyword for that advertiser. In another example, the remote network entity 214 reserves the keyword for the advertiser with a highest bid while setting the graphic fee based on a second highest bid. Other bidding systems will be apparent to those skilled in the art.

The sensor hub 224 may be further configured to select a set of action icons for the selected display session. In one example, the sensor hub 224 selects the set of actions at the same time as selection of the display session. In other implementations, the sensor hub 224 selects the set of actions at a later time, for example, after the display trigger or during the first user interaction (e.g., while the user maintains a touch input to display the second graphic). The display session information in one example comprises a display session with a set of available action icons. Each action icon corresponds to an action indicator. The sensor hub 224 in one example selects a set of action icons (or action indicators) for the selected display session based on the set of detected keywords. The sensor hub 224 selects the action icons analogously to the display session, for example, based on at least one of the set of detected keywords, a user profile associated with the electronic device 100, a location associated with the current display session (e.g., where the electronic device 100 is currently located), proximity to a predetermined location (e.g., a shopping mall or restaurant), a time of day associated with the current display session, a selected action indication from a previous display session, a user interaction for the current display session, or other information stored by the electronic device 100 (e.g., the user's preferences or search history). In a further example, the sensor hub 224 selects a graphic or action icon based on trigger data associated with the display session or trigger data associated with the graphic or action icon. Alternatively, one or more action icons may be "default" action icons that are always part of the selected set of action icons.

Figure 5:
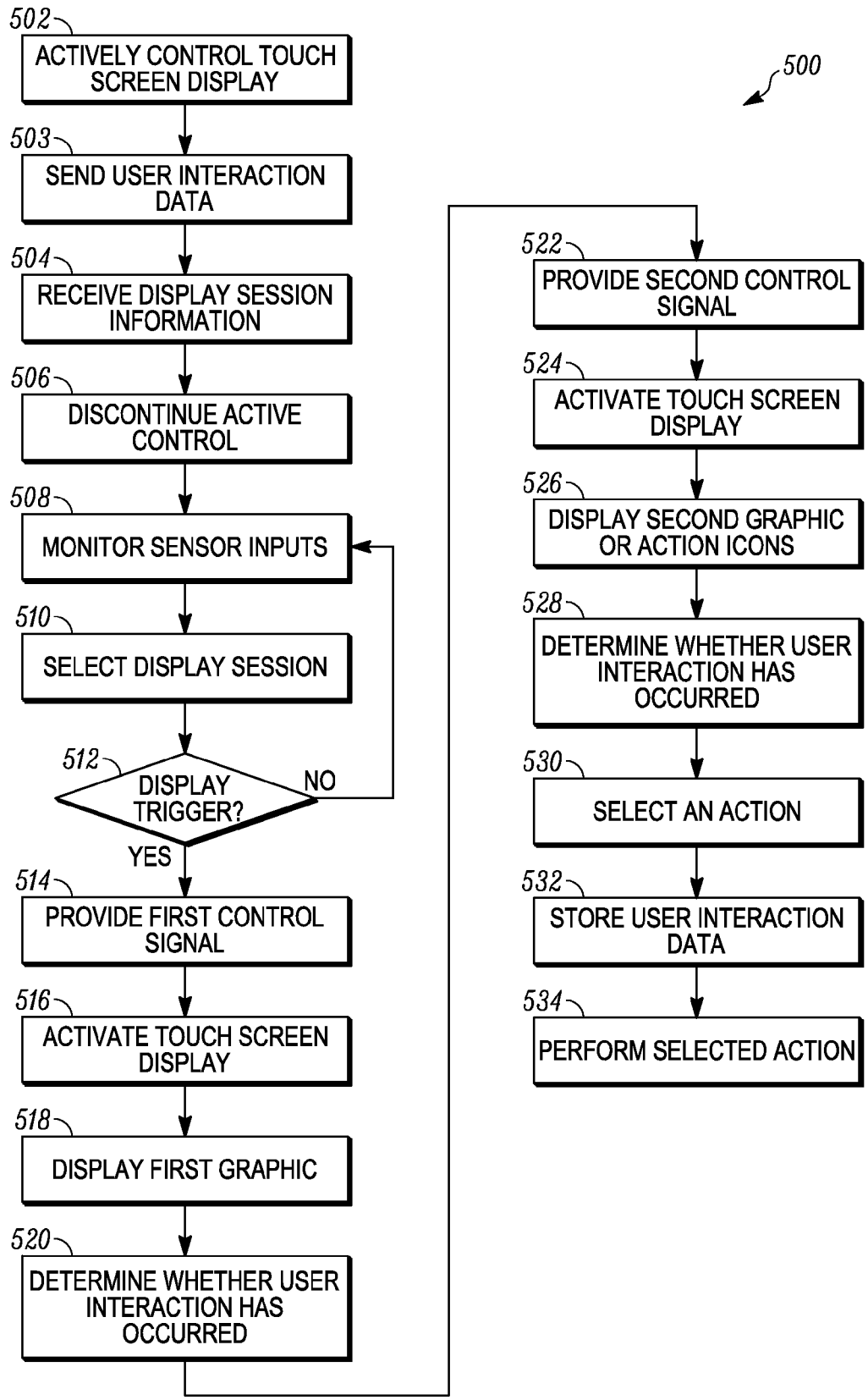
FIG. 5 is a flowchart illustrating one embodiment of a method for selecting a display session by the electronic device of FIG. 1.

The sensor hub 224 determines (512), in the lower-power mode, whether a display trigger has occurred. While the selection of the display session is shown in FIG. 5 as being before the display trigger, in alternative embodiments the selection may occur after the display trigger. However, selection of the display session as shown in FIG. 5 allows for an up-to-date display session to be shown based on most recently received keywords or other trigger data. For example, the sensor hub 224 may select a first graphic at a first time based on a first keyword. After detection of a second keyword at a second time after the first time, the sensor hub 224 selects a second graphic based on the most second keyword. In this case, the second graphic is displayed without the first graphic being displayed.

The sensor hub 224 is configured to determine that the display trigger has occurred when at least one sensor input corresponds to the user interacting with the electronic device 100. The electronic device 100 may have entered the intermediate mode when the user placed the electronic device 100 in a pocket, purse, phone case, or other compartment or when the user placed the electronic device 100 with the front surface 103 facing a table top (not shown) or other surface that obscures or covers the touch screen display 105. Alternatively, the user may have left the electronic device 100 on a table or desk where it has been sitting stationary for a period of time. The sensor hub 224 is thus configured to determine the display trigger has occurred upon an indication that the electronic device 100 has been moved after a period of being stationary or upon an indication that the touch screen display 105 of the electronic device 100 has changed to an uncovered state after a period of being in a covered state. For example, the display trigger is a response to an input from a proximity sensor, light sensor, accelerometer, or gyroscope of the sensors 113.

Upon the occurrence of the display trigger (YES at 512), the sensor hub 224 is configured to provide (514) at least one first control signal to the touch screen display 105. The sensor hub 224 provides the first control signal to cause the touch screen display 105 to activate and display a graphic or action icon for the selected display session. In response to the first control signal, the touch screen display 105 is configured to activate (516), during the lower-power mode of operation, a first portion of the touch screen display 105 (e.g., using the Smart Partial OLED display technology). The touch screen display 105 then displays (518), in the lower-power mode of operation and in response to the first control signal, a graphic or a first portion of a graphic on a first area of the touch screen display 105 that is within the first portion of the touch screen display 105. Referring to FIG. 7B, a breathing view image 710 (analogous to the breathing view image 302) is shown with a graphic 712 on the first area of the touch screen display 105. In this case, the display session is a coupon or other advertisement. While the graphic 712 is shown in a lower portion of the touch screen display 105, other portions of the touch screen display 105 may be activated for display. The portion of the touch screen display 105 activated for display may be different for each graphic or display session.

The graphic 712 in one example corresponds to one or more hit areas that can be touched by a user during operation in the lower-power mode of operation. For a touch input, the user interaction data in one example comprises at least one of a duration of the touch input or a location of the touch input on the touch screen display 105 (e.g., a hit area). The location may indicate one or more pixels of the touch screen display 105 that were touched, a region of the touch screen display 105 that was touched, or one or more pixels or regions of the graphic 712 that were touched. For a gesture input, the user interaction data in one example indicates a gesture type, such as a shake, rotation (e.g., between landscape and portrait orientations), or other movement. For an audio input, the user interaction data in one example indicates one or more keywords detected within the audio input. For a key press input, the user interaction data in one example indicates which input key 107 was pressed and may further indicate a duration of the key press (or a pattern of key presses).

The sensor hub 224 is configured to determine (520), in the lower-power mode of operation, whether a first user interaction has occurred that corresponds to the graphic 712 during the display of the graphic 712. The sensor hub 224 uses sensor inputs provided by the sensors 113 to determine whether the first user interaction has occurred. The sensor hub 224 is configured to provide (522), in the lower-power mode of operation and in response to a first touch input (e.g., of the first user interaction), at least one second control signal to the touch screen display 105. In one example, the sensor hub 224 provides the second control signal after the first touch input has touched the graphic 712 for a duration that meets a first touch threshold. In another example, the sensor hub 224 provides the second control signal for display of a second graphic while the first touch input is substantially maintained such that removal of the touch input (e.g., the user removes their finger from the touch screen display 105) causes the second graphic to be cleared from the touch screen display 105.

In response to the second control signal and in the lower-power mode of operation, the touch screen display 105 activates (524) a second portion of the touch screen display 105 and displays (526) a second graphic on a second area of the touch screen display 105 that is within the second portion of the touch screen display 105. Optionally, the touch screen display 105 displays (526) the selected set of action icons. Referring to FIG. 7C, a peek view image 720 (analogous to the peek view image 314) is shown with action icons 732, 734, and 736 on the second area of the touch screen display 105. In alternative implementations, the sensor hub 224 may provide an additional control signal to the touch screen display 105 in order to provide a peek animation image prior to display of the peek view image 720, as described above with reference to FIG. 3C.

After or during display of the action icons 732, 734, and 736, the sensor hub 224 is configured to determine (528), in the lower-power mode of operation, whether a second touch input (e.g., a second user interaction) has occurred that corresponds to either the second area (e.g., the action icons 732, 734, 736) or a third area of the touch screen display 105 that is distinct from the second area. Analogous to the first user interaction, the second user interaction may be a touch input (e.g., within a hit area), gesture input, audio input, key press, view, or combination thereof. The third area of the touch screen display 105 in one example comprises one or more portions of the touch screen display 105 outside of the action icons 732, 734, and 736. The user may interact with the action icons 732, 734, or 736 by sliding or swiping their finger up to "select" one of the action icons (e.g., based on which hit area or pixels correspond to the touch input), or may slide their finger to the third area to indicate that they do not wish to select an action icon.

In response to the second touch input and in the lower-power mode, the sensor hub 224 selects (530) an action icon from the set of action icons for the display session and stores (532) the corresponding action indication with the user interaction data. In one example, the user interaction data comprises a set of matched keywords that match between the set of detected keywords and the one or more keywords of the set of stored keywords that correspond to the selected graphic and a match count associated with each keyword of the set of matched keywords. While the user interaction data is shown as being stored in step 532, in alternative implementations the storing is performed upon the display trigger, the first user interaction, the second user interaction, or a combination thereof. In some implementations, the action indication may indicate an action to be performed (534) by the electronic device 100 in the lower-power mode of operation or the higher-power mode of operation.

Display sessions correspond to at least one of a user survey, an offer to the user of the electronic device 100, an event notification, a subscription notification, a social media survey that allows the user to "+1" or "like" a graphic or advertisement, an advertisement with an animated graphic, a link to a uniform resource locator, a navigation location, a user application (e.g., launching or downloading the user application), a telephone number for placing a call, a sharing prompt for sharing a graphic or advertisement with a friend, a product purchase initiation, or a combination thereof. Other examples of display sessions will be apparent to those skilled in the art. While several display sessions and action indications have been described separately, in alternative embodiments a plurality of display sessions may be combined into a single display session (e.g., with multiple user interactions). Additionally, multiple actions may be combined and represented by a single action icon or action indication. A display session may use a single action icon or a plurality of action icons corresponding to action indications.

FIG. 8, represented by FIGS. 8A and 8B, is a diagram of one example of user interaction data stored by one or more remote network devices 214. As described above, a display session may include multiple graphics, action icons, and associated information (e.g., time of day, location). The electronic device 100 is configured to store one or more portions of this information with the user interaction data and to send the user interaction data to the remote network entity 214. Referring to FIG. 8, a table 800 includes user interaction data from a plurality of electronic devices 100 representing multiple users.

In the example shown by table 800, each row corresponds to a display session on a different electronic device 100 with a column indicating information for display sessions. A Primary Advertisement ID is shown to identify a first graphic of a display session and a Secondary Advertisement ID is shown to identify a second graphic of a display session. A set of action indications ("Action 1", "Action 2", and "Action 3") show which action indications were selected and displayed for a particular display session. A User ID indicates an identity of a user of the electronic device 100 or an ID of the electronic device 100. A Device Model indicates a model name of the electronic device 100. The Time of Day indicates a time of day at which the display session was displayed by the electronic device 100. The Device Location indicates GPS coordinates of the electronic device 100 when the display session was displayed. The Wake Reason indicates an event which caused the sensor hub 224 to display the display session, for example, whether a proximity sensor indicates that the electronic device 100 has been removed from a pocket or an accelerometer indicates that the electronic device 100 has moved after a period of being stationary. A View Duration indicates a length of time that a graphic of the display session was viewed. An Action Taken indicates which action indicator was selected by the user, with a separate value (e.g., "0") used to indicate that no action was taken. In alternative implementations, additional columns of user interaction data may be stored, or columns may be omitted.

Table 800 further includes at least one keyword ("Voice Keyword 1", "Voice Keyword 2", "Voice Keyword 3") for a display session with a corresponding recentness indicator ("KW1 time before display", "KW2 time before display", "KW3 time before display"). The recentness indicator indicates an elapsed time (e.g., time in seconds) since the detection time for each keyword. As shown in FIG. 8, each keyword that corresponds to the display session is shown and a value of 0 indicates that the keyword was not detected. In alternative embodiments, only detected keywords are stored.

Figure 9A:
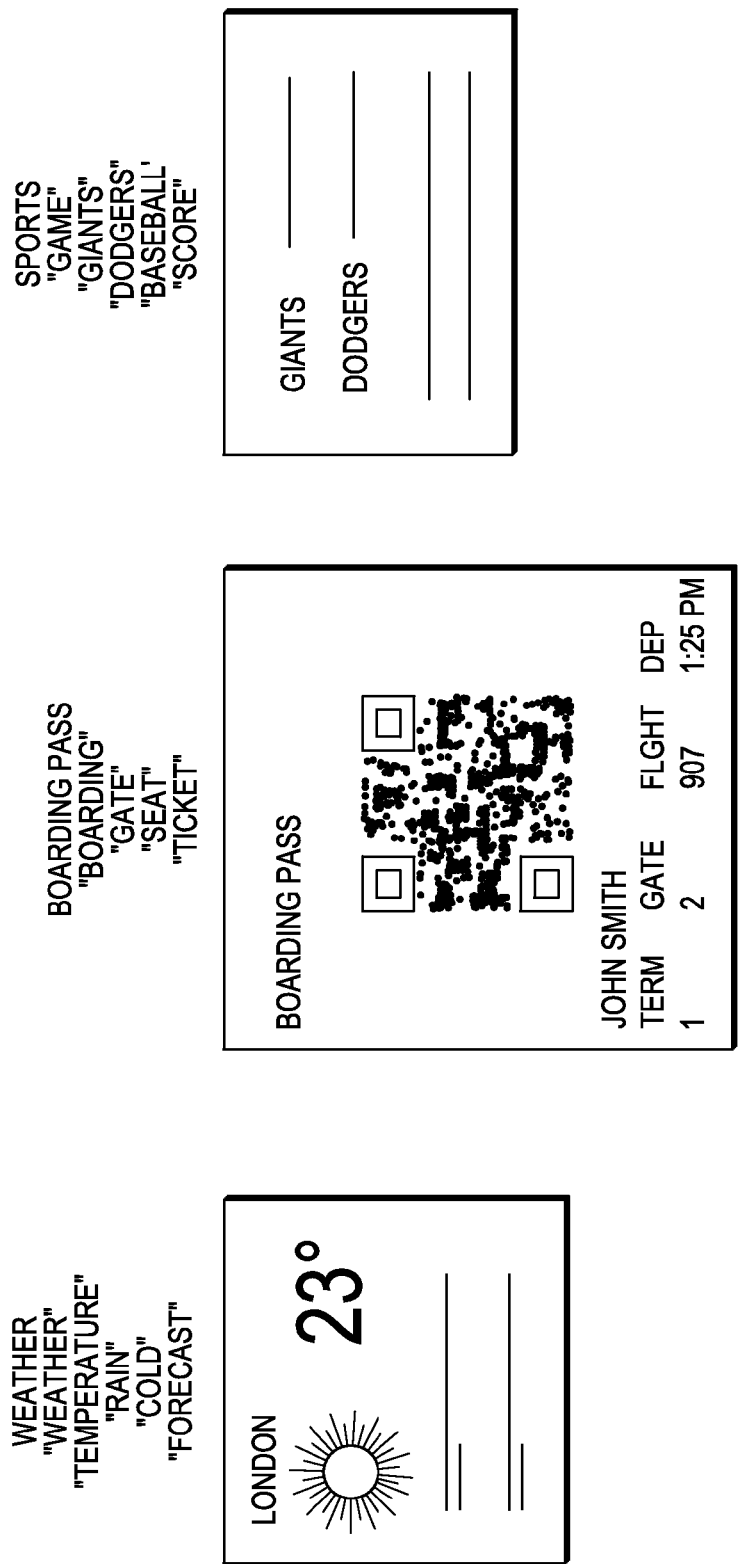
FIG. 9, represented by FIGS. 9A, 9B and 9C, is a diagram of one example of categories with keywords for display sessions.
Figure 9B:
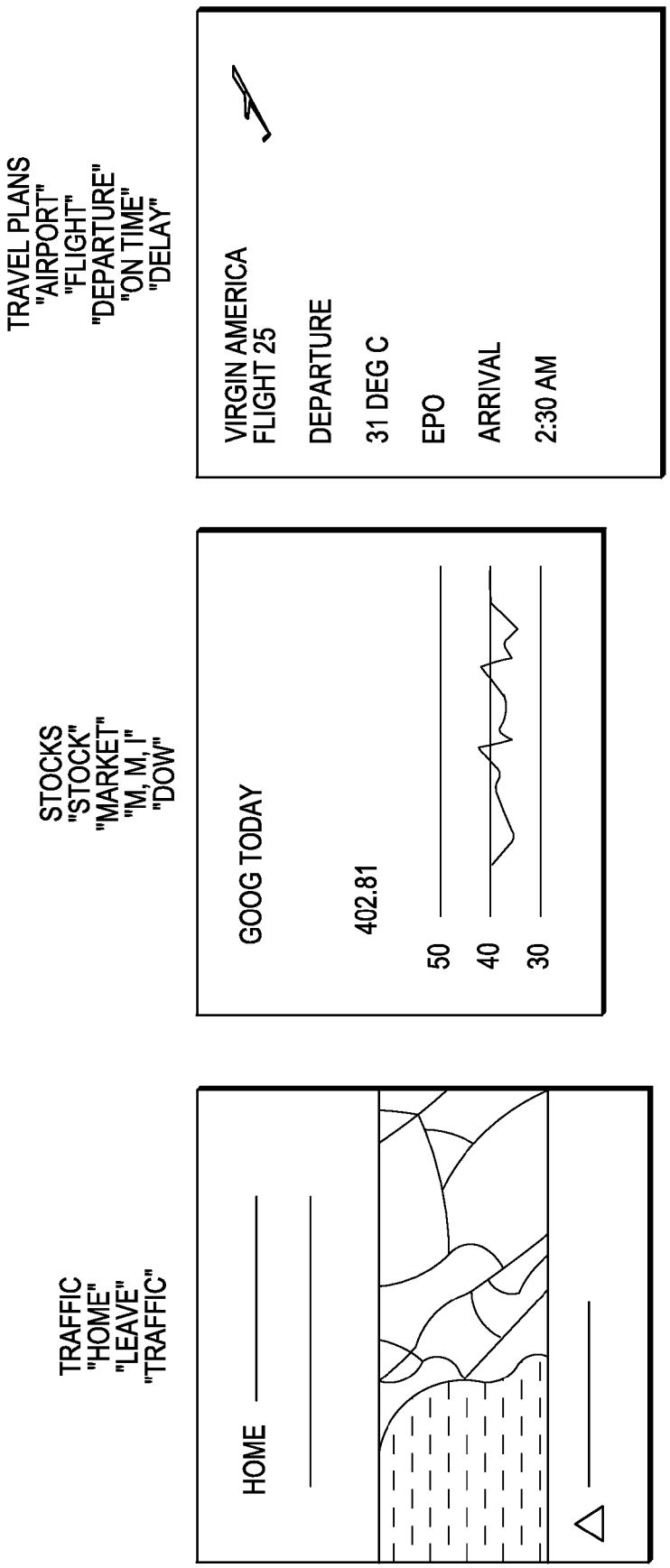

Turning to FIG. 9, represented by FIGS. 9A, 9B and 9C, a diagram 900 illustrates one example of a plurality of categories with keywords for display sessions. As described above, the display session information may include at least one category. Example categories as shown in FIG. 9 include: Weather, Boarding Pass, Sports, Traffic, Stocks, Travel Plans, Movie Ticket, Movies, and Meetings. Additional categories will be apparent to those skilled in the art. Each category corresponds to at least one keyword. For example, the Boarding Pass category corresponds to the keywords Boarding, Gate, Seat, and Ticket. As shown in FIG. 9, some keywords are shared between categories (e.g., Ticket is also shown in the Movie Ticket category). In other implementations, the keywords are unique to a category. The keywords that correspond to the categories may be shared with the keywords for a display session or unique. The categories and corresponding keywords in one example are pre-programmed in the electronic device 100. In another example, the categories and corresponding keywords are received with the display session information.

During selection (510) of the display session, the sensor hub 224 in one example uses the categories to select a display session. For example, the sensor hub 224 selects a category based on the detected keywords, analogously to selection of the display sessions as described above. In one example, the selected category corresponds to an information graphic that is displayed (518), such as a weather forecast, boarding pass, or sports scorecard. In another example, the category represents a plurality of display sessions, such as advertisements and information graphics. In this case, the sensor hub 224 selects one of the advertisements or information graphics from the selected category as the selected display session.

It can be seen from the foregoing that a method and system for selection of graphics for display to a user is shown. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The apparatus described herein may include a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

We claim:

1. A method comprising:
   actively controlling, with an application processor of an electronic device and while the electronic device is operating in a higher-power mode of operation, an entire display screen of a touch screen display of the electronic device;
   receiving, by the application processor and while the electronic device is operating in the higher-power mode of operation, a set of graphics and a set of stored keywords, wherein each graphic of the set of graphics corresponds to one or more keywords of the set of stored keywords;
   transitioning from operating in the higher-power mode of operation to operating in a lower-power mode of operation by at least discontinuing, by the application processor, actively controlling the touch screen display;
   receiving, by a microphone of the electronic device and while the electronic device operates in the lower-power mode of operation, audio signals;
   determining, by a sensor hub of the electronic device and while the electronic device operates in the lower-power mode of operation, a set of detected keywords from the set of stored keywords that are present in the audio signals;
   storing, by the sensor hub and while the electronic device operates in the lower-power mode of operation, the set of detected keywords that are present in the audio signals;
   selecting, by the sensor hub and while the electronic device operates in the lower-power mode of operation, a graphic from the set of graphics based on a comparison between the set of detected keywords and the set of stored keywords;
   providing, by the sensor hub and while the electronic device operates in the lower-power mode of operation, at least one control signal to the touch screen display; and
   in response to the at least one control signal:
      activating, by the sensor hub and while the electronic device operates in the lower-power mode of operation, only a first portion of the touch screen display; and
      displaying, by the touch screen display and while the electronic device operates in the lower-power mode of operation, a first portion of the selected graphic on a first area of the touch screen display that is within the first portion of the touch screen display.

2. The method of claim 1, wherein selecting the graphic comprises:
   determining, by the sensor hub, a match indicator that indicates a number of keywords that match between the set of detected keywords and the set of stored keywords for at least one graphic of the set of graphics;
   selecting, by the sensor hub, the graphic with a highest match indicator from the set of graphics.

3. The method of claim 1, wherein each detected keyword of the set of detected keywords is associated with a respective detection time, and wherein selecting the graphic comprises:
   determining, by the sensor hub, a match indicator that indicates a number of keywords that match between the set of detected keywords and the set of stored keywords for at least one graphic of the set of graphics;
   determining, by the sensor hub, a recentness indicator that indicates an elapsed time since the respective detection time for each detected keyword;
   selecting, by the sensor hub, the graphic from the set of graphics based on the match indicator and the recentness indicator.

4. The method of claim 3, wherein selecting the graphic comprises selecting, by the sensor hub, the graphic with a lowest recentness indicator.

5. The method of claim 3, wherein the at least one control signal is a first control signal, the method further comprising:
   selecting, by the sensor hub and while the electronic device is operating in the lower-power mode of operation, a set of action icons for the selected graphic based on the set of detected keywords;
   after the touch screen display displays the first portion of the selected graphic on the first area of the touch screen display that is within the first portion of the touch screen display, providing, by the sensor hub and while the electronic device is operating in the lower-power mode of operation and in response to a first touch input that corresponds to the first area, at least one second control signal to the touch screen display;
   activating, by the sensor hub and while the electronic device is operating in the lower-power mode of operation and in response to the at least one second control signal, a second portion of the touch screen display;
   displaying, by the touch screen display and while the electronic device is operating in the lower-power mode of operation and in response to the at least one second control signal, a second portion of the selected graphic on a second area of the touch screen display that is within the second portion of the touch screen display;
   selecting, by the sensor hub and while the electronic device is operating in the lower-power mode of operation, an action indication for the selected graphic from a set of action indications that corresponds to the set of action icons in response to a second touch input that corresponds to the second area; and
   performing, by the sensor hub, a selected action that corresponds to the selected action indication.

6. The method of claim 3,
   wherein selecting the graphic comprises:
      selecting, by the sensor hub, a first graphic from the set of graphics at a first time; and
      selecting, by the sensor hub and while the electronic device is operating in the lower-power mode of operation, a second graphic from the set of graphics at a second time after the first time based on a most recently detected keyword of the set of detected keywords; and
   wherein displaying the first portion of the selected graphic comprises displaying, by the touch screen display, a first portion of the second graphic.

7. The method of claim 3,
   wherein selecting the graphic from the set of graphics comprises maintaining, by the sensor hub, the set of graphics in a priority list based on the match indicator and the recentness indicator; and
   wherein displaying the first portion of the graphic comprises displaying, by the sensor hub, a first portion of a highest priority graphic of the priority list.

8. The method of claim 1, further comprising:
   storing, by the sensor hub and while the electronic device is operating in the lower-power mode of operation, graphic display information for the selected graphic after displaying the first portion of the selected graphic, wherein the graphic display information comprises a set of matched keywords that match between the set of detected keywords and the one or more keywords of the set of stored keywords that correspond to the selected graphic and a match count associated with each keyword of the set of matched keywords.

9. The method of claim 1, wherein at least one stored keyword of the set of stored keywords comprises a phrase of multiple words.

10. The method of claim 1, wherein providing the at least one control signal comprises providing, by the sensor hub, the at least one control signal in response to receiving an indication that the electronic device has been moved after a period of being stationary or in response to receiving an indication that the touch screen display of the electronic device has changed to an uncovered state after a period of being in a covered state.

11. The method of claim 1, wherein:
the application processor is configured to consume a first amount of power while the electronic devices is operating in the higher-power mode; and
the sensor hub is configured to:
consume a second amount of power while the electronic device is operating in the lower-power mode, wherein the second amount of power is less than the first amount of power; and
control the one or more sensors while the electronic device operates in the higher-power mode of operation and while the electronic device operates in the lower-power mode of operation.

12. An electronic device comprising:
a receiver configured to receive wireless communication signals;
a memory device;
a touch screen display;
a microphone configured to receive audio signals within an audible range of the microphone;
at least one application processor configured to:
control the touch screen display while the electronic device operates in a higher-power mode of operation; and
receive and store a set of graphics and a set of stored keywords in the memory device while the electronic device operates in the higher-power mode of operation, wherein each graphic of the set of graphics corresponds to one or more keywords of the set of stored keywords; and
a sensor hub configured to:
control the touch screen display while the electronic device operates in a lower-power mode of operation;
determine, while the electronic device operates in the lower-power mode of operation, a set of detected keywords of the set of stored keywords that are present in the audio signals;
store, while the electronic device operates in the lower-power mode of operation, the set of detected keywords present in the audio signals;
select, while the electronic device operates in the lower-power mode of operation, a graphic from the set of graphics based on a comparison between the set of detected keywords and the set of stored keywords; and
provide, while the electronic device operates in the lower-power mode of operation, at least one control signal to the touch screen display,
wherein the touch screen display is configured to:
while the electronic device operates in the lower-power mode of operation and in response to the at least one control signal:
activate only a first portion of the touch screen display; and
display a first portion of the selected graphic on a first area of the touch screen display that is within the first portion of the touch screen display.

13. The electronic device of claim 12, wherein the sensor hub is further configured to:
determine, while the electronic device operates in the lower-power mode of operation, a match indicator that indicates a number of keywords that match between the set of detected keywords and the set of stored keywords for at least one graphic of the set of graphics; and
select, while the electronic device operates in the lower-power mode of operation, the graphic with a highest match indicator from the set of graphics.

14. The electronic device of claim 12, wherein:
each detected keyword of the set of detected keywords is associated with a detection time; and
the sensor hub is further configured to:
determine, while the electronic device operates in the lower-power mode of operation, a match indicator that indicates a number of keywords that match between the set of detected keywords and the set of stored keywords for at least one graphic of the set of graphics;
determine, while the electronic device operates in the lower-power mode of operation, a recentness indicator that indicates an elapsed time since the detection time for each detected keyword; and
select, while the electronic device operates in the lower-power mode of operation, the graphic from the set of graphics based on the match indicator and the recentness indicator.

15. The electronic device of claim 14, wherein the sensor hub is further configured to:
select, while the electronic device operates in the lower-power mode of operation, the graphic with a lowest recentness indicator.

16. The electronic device of claim 14,
wherein the at least one control signal is at least one first control signal and the sensor hub is further configured to:
select, while the electronic device operates in the lower-power mode of operation, a set of action icons for the selected graphic based on the set of detected keywords; and
after providing the at least one first control signal, provide, while the electronic device operates in the lower-power mode of operation and in response to a first touch input that corresponds to the first area, at least one second control signal to the touch screen display;
wherein the touch screen display is configured to:
while the electronic device operates in the lower-power mode of operation and in response to the at least one second control signal:
activate a second portion of the touch screen display; and
display a second portion of the selected graphic on a second area of the touch screen display that is within the second portion of the touch screen display; and
wherein the sensor hub is further configured to:
select, while the electronic device operates in the lower-power mode of operation, an action indication, from a set of action indications that corresponds to the set of action icons, for the selected graphic in response to a second touch input that corresponds to the second area; and perform a selected action that corresponds to the selected action indication.

17. The electronic device of claim 14, wherein the sensor hub is further configured to:

maintain, while the electronic device operates in the lower-power mode of operation, the set of graphics in a priority list based on the match indicator and the recentness indicator; and select, while the electronic device operates in the lower-power mode of operation, a highest priority graphic of the priority list as the selected graphic.

18. The electronic device of claim 14, wherein the sensor hub is further configured to store, while the electronic device operates in the lower-power mode of operation, graphic display information for the selected graphic after displaying the first portion of the selected graphic; and wherein the graphic display information comprises a set of matched keywords that match between the set of detected keywords and the one or more keywords of the set of stored keywords that correspond to the selected graphic and a match count associated with each keyword of the set of matched keywords.

19. The electronic device of claim 14, wherein the sensor hub is further configured to provide the at least one control signal in response to receiving an indication that the electronic device has been moved after a period of being stationary or in response to receiving an indication that the touch screen display of the electronic device has changed to an uncovered state after a period of being in a covered state.

20. An electronic device comprising:

a memory device;

a touch screen display;

one or more sensors including a microphone configured to receive audio signals within an audible range of the microphone;

at least one application processor configured to:

control the touch screen display only while the electronic device operates in a higher-power mode of operation; and receive and store a set of graphics and a set of stored keywords in the memory device while the electronic device operates in the higher-power mode of operation, wherein each graphic of the set of graphics corresponds to one or more keywords of the set of stored keywords; and a sensor hub configured to:

control the one or more sensors while the electronic device operates in the higher-power mode of operation and while the electronic device operates in the lower-power mode of operation;

control, by consuming less power than the at least one application processor, the touch screen display while the electronic device operates in a lower-power mode of operation;

determine, while the electronic device operates in the lower-power mode of operation, a set of detected keywords of the set of stored keywords that are present in the audio signals;

store, while the electronic device operates in the lower-power mode of operation, the set of detected keywords present in the audio signals;

select, while the electronic device operates in the lower-power mode of operation, a graphic from the set of graphics based on a comparison between the set of detected keywords and the set of stored keywords; and provide, while the electronic device operates in the lower-power mode of operation, at least one control signal to the touch screen display, wherein the touch screen display is configured to:

activate, while the electronic device operates in the lower-power mode of operation and in response to the at least one control signal, only a first portion of the touch screen display; and display, while the electronic device operates in the lower-power mode of operation and in response to the at least one control signal, a first portion of the selected graphic on a first area of the touch screen display that is within the first portion of the touch screen display.

\* \* \* \* \*